(12) United States Patent
Itano et al.

(10) Patent No.: US 11,477,401 B2
(45) Date of Patent: Oct. 18, 2022

(54) IMAGING DEVICE AND IMAGING SYSTEM

(71) Applicant: CANON KABUSHIKI KAISHA, Tokyo (JP)

(72) Inventors: Tetsuya Itano, Kanagawa (JP); Masaki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 17/178,442

(22) Filed: Feb. 18, 2021

(65) Prior Publication Data
US 2021/0274111 A1 Sep. 2, 2021

(30) Foreign Application Priority Data

Feb. 28, 2020 (JP) .............................. JP2020-033001

(51) Int. Cl.
| | |
|---|---|
| H04N 5/355 | (2011.01) |
| H04N 5/369 | (2011.01) |
| G06T 7/50 | (2017.01) |
| H04N 5/378 | (2011.01) |
| H04N 5/361 | (2011.01) |

(52) U.S. Cl.
CPC ............ H04N 5/3559 (2013.01); G06T 7/50 (2017.01); H04N 5/361 (2013.01); H04N 5/36965 (2018.08); H04N 5/378 (2013.01)

(58) Field of Classification Search
CPC .. H04N 5/3559; H04N 5/361; H04N 5/36965; H04N 5/378; H04N 5/3591; G06T 7/50
See application file for complete search history.

(56) References Cited

U.S. PATENT DOCUMENTS

| | | | |
|---|---|---|---|
| 7,126,102 B2 | 10/2006 | Inoue et al. | 250/214 R |
| 7,321,110 B2 | 1/2008 | Okita et al. | 250/208.1 |
| 7,385,172 B2 | 6/2008 | Inoue et al. | 250/214 R |
| 7,408,210 B2 | 8/2008 | Ogura et al. | 257/233 |
| 7,460,162 B2 | 12/2008 | Koizumi et al. | 348/294 |
| 7,462,810 B2 | 12/2008 | Kobayashi et al. | 250/208.1 |
| 7,550,793 B2 | 6/2009 | Itano et al. | 257/239 |
| 7,592,579 B2 | 9/2009 | Tamura et al. | 250/208.1 |
| 7,709,780 B2 | 5/2010 | Inoue et al. | 250/214.1 |
| 7,719,587 B2 | 5/2010 | Ogura et al. | 348/302 |
| 7,741,593 B2 | 6/2010 | Iwata et al. | 250/214 R |
| 7,825,974 B2 | 11/2010 | Itano et al. | 348/308 |
| 7,920,192 B2 | 4/2011 | Watanabe et al. | 348/308 |

(Continued)

FOREIGN PATENT DOCUMENTS

| | | |
|---|---|---|
| JP | 2010124418 A | 6/2010 |
| JP | 2017-195563 A | 10/2017 |
| JP | 2019-41283 A | 3/2019 |

*Primary Examiner* — Sinh Tran
*Assistant Examiner* — Zhenzhen Wu
(74) *Attorney, Agent, or Firm* — Venable LLP

(57) ABSTRACT

In an imaging device according to the present disclosure, during a period in which a signal from an amplifier transistor is output from a pixel via a select transistor, the gate voltage of the capacitance addition transistor changes frons the first voltage VH to the second voltage VL, and the amount of voltage change per time until the gate voltage changes from the first voltage VH to the second voltage VL is smaller than the amount of voltage change per unit time until the gate voltage changes from the second voltage VL to the first voltage VH.

20 Claims, 13 Drawing Sheets

(56) References Cited

U.S. PATENT DOCUMENTS

| | | | | |
|---|---|---|---|---|
| 7,978,241 | B2 | 7/2011 | Koizumi et al. | 348/294 |
| 7,982,789 | B2 | 7/2011 | Watanabe et al. | 348/308 |
| 8,023,025 | B2 | 9/2011 | Itano et al. | 348/308 |
| 8,063,351 | B2 | 11/2011 | Kobayashi et al. | 250/208.1 |
| 8,063,958 | B2 | 11/2011 | Okita et al. | 348/241 |
| 8,063,967 | B2 | 11/2011 | Itano et al. | 348/308 |
| 8,081,245 | B2 | 12/2011 | Itano et al. | 348/301 |
| 8,085,319 | B2 | 12/2011 | Ono et al. | 348/241 |
| 8,159,577 | B2 | 4/2012 | Iwata et al. | 348/296 |
| 8,289,431 | B2 | 10/2012 | Itano | 348/308 |
| 8,355,066 | B2 | 1/2013 | Iwata et al. | 348/296 |
| 8,363,137 | B2 | 1/2013 | Sonoda et al. | 348/302 |
| 8,368,790 | B2 | 2/2013 | Itano et al. | 348/301 |
| 8,390,708 | B2 | 3/2013 | Koizumi et al. | 348/294 |
| 8,400,546 | B2 | 3/2013 | Itano et al. | 348/308 |
| 8,411,187 | B2 | 4/2013 | Watanabe et al. | 348/308 |
| 8,441,558 | B2 | 5/2013 | Okita et al. | 348/241 |
| 8,598,901 | B2 | 12/2013 | Hiyama et al. | 324/750.3 |
| 8,670,049 | B2 | 3/2014 | Ono et al. | 348/241 |
| 8,698,935 | B2 | 4/2014 | Okita et al. | 348/314 |
| 8,711,259 | B2 | 4/2014 | Maehashi et al. | 348/294 |
| 8,749,675 | B2 | 6/2014 | Koizumi et al. | 348/294 |
| 8,836,838 | B2 | 9/2014 | Nakamura et al. | 348/308 |
| 8,896,029 | B2 | 11/2014 | Koizumi et al. | 257/202 |
| 8,928,786 | B2 | 1/2015 | Iwata et al. | 348/294 |
| 9,029,752 | B2 | 5/2015 | Saito et al. | 250/208.1 |
| 9,083,906 | B2 | 7/2015 | Nakamura et al. | H04N 5/378 |
| 9,232,165 | B2 | 1/2016 | Saito et al. | H03M 1/08 |
| 9,288,415 | B2 | 3/2016 | Yamazaki et al. | H04N 5/3575 |
| 9,438,828 | B2 | 9/2016 | Itano et al. | H04N 5/3456 |
| 9,438,841 | B2 | 9/2016 | Yamazaki et al. | H04N 5/37457 |
| 9,602,752 | B2 | 3/2017 | Kobayashi et al. | H01L 27/14603 |
| 9,825,077 | B2 | 11/2017 | Watanabe et al. | H01L 27/14689 |
| 10,015,430 | B2 | 7/2018 | Kobayashi et al. | H01L 27/14609 |
| 10,531,033 | B2 | 1/2020 | Morita et al. | H04N 1/00978 |
| 10,609,243 | B2 | 3/2020 | Ochiai et al. | H04N 5/3575 |
| 10,645,325 | B2 | 5/2020 | Takado et al. | H04N 5/378 |
| 10,652,531 | B2 | 5/2020 | Kono et al. | H04N 5/3745 |
| 10,841,519 | B2 | 11/2020 | Itano | H04N 5/3745 |
| 2010/0128156 | A1 | 5/2010 | Tanaka | |
| 2011/0003426 | A1 | 1/2011 | Watanabe et al. | 438/73 |
| 2013/0002916 | A1 | 1/2013 | Itano | 348/302 |
| 2015/0122975 | A1 | 5/2015 | Saito et al. | 250/208.1 |
| 2016/0227141 | A1 | 8/2016 | Kobayashi et al. | H04N 5/341 |
| 2017/0310914 | A1 | 10/2017 | Tsuboi | |
| 2017/0373107 | A1* | 12/2017 | Koga | H01L 27/14667 |
| 2018/0197907 | A1 | 7/2018 | Wada et al. | H04N 9/045 |
| 2019/0124278 | A1* | 4/2019 | Velichko | H04N 5/35536 |
| 2019/0166323 | A1 | 5/2019 | Saito et al. | B60W 2520/14 |
| 2019/0215471 | A1* | 7/2019 | Oh | H01L 27/14645 |
| 2020/0227454 | A1* | 7/2020 | Geurts | H01L 27/14603 |
| 2020/0228741 | A1 | 7/2020 | Takado et al. | H04N 5/367 |
| 2020/0236348 | A1 | 7/2020 | Kono et al. | H04N 5/3559 |
| 2021/0021770 | A1 | 1/2021 | Nakazawa et al. | G06T 2207/30252 |
| 2021/0021782 | A1 | 1/2021 | Sato et al. | B60R 2300/301 |

\* cited by examiner

FIG. 1
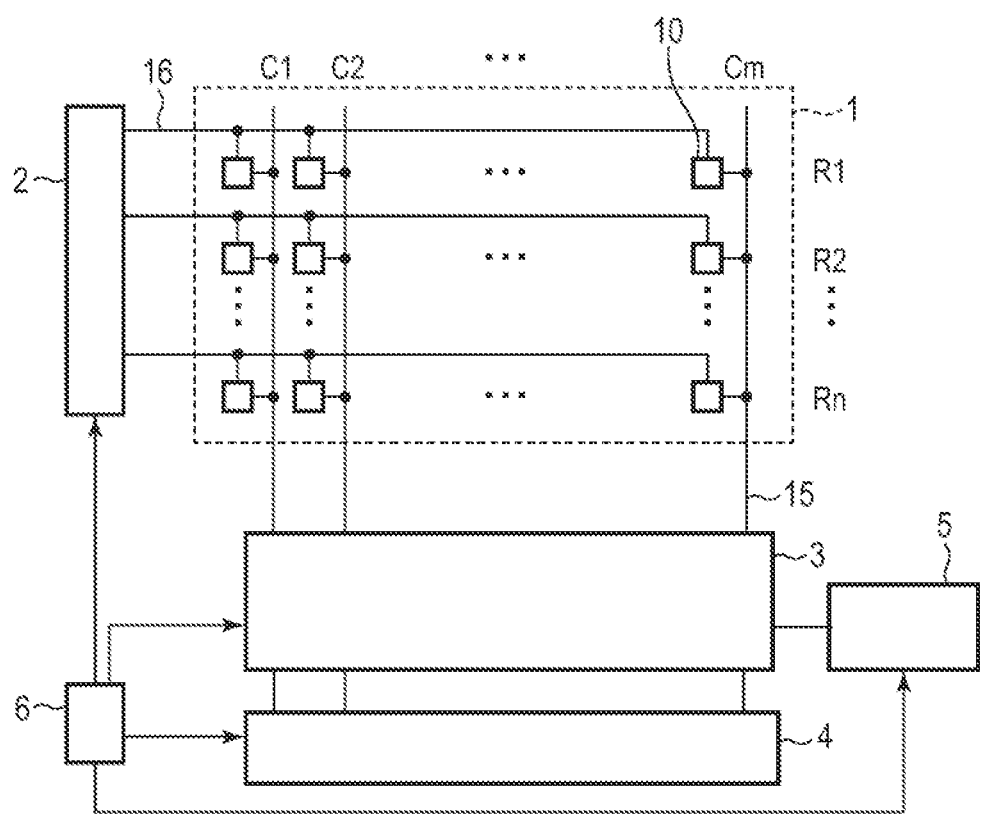
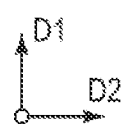

ized with the same references, and the description thereof may be simplified. In the following

IMAGING DEVICE AND IMAGING SYSTEM

BACKGROUND OF THE INVENTION

Field of the Invention

The present invention relates to an imaging device and an imaging system.

Description of the Related Art in an imaging apparatus such as a CMOS image sensor, an attempt has been made to expand the dynamic range. Japanese Patent Application Laid-Open No. 2010-124418 discloses an imaging apparatus in which a capacitance addition transistor is connected to a floating diffusion portion (hereinafter, the FD portion). In the solid-state imaging device disclosed in Japanese Patent Application Laid-Open No. 2010-124418, the conversion gain in the FD portion is switched by turning on or off the capacitance addition transistor to expand the dynamic range.

However, in the imaging apparatus disclosed in Japanese Patent Application Laid-Open No. 2010-124418, there has been a problem that the image quality deteriorates due to the operation f the capacitance addition transistor.

SUMMARY OF THE INVENTION

The present invention has been made in view of the above problems, and it is an object of the present invention to reduce image quality deterioration caused by the operation of a capacitance addition transistor.

According to one aspect of the embodiments, provided is an imaging device including a pixel including a photoelectric converter, an amplifier transistor having an input node that holds charge from the photoelectric converter and configured to output a signal based on the charge of the input node, a select transistor configured to output the signal output from the amplifier transistor to a readout circuit for reading out the signal, a reset transistor configured to set a potential of the input node to a prescribed reset potential, and a capacitance addition transistor connected to the input node and configured to switch the capacitance value of the input node, and a drive circuit configured to turn on the capacitance addition transistor by setting a gate voltage of the capacitance addition transistor tai a first voltage, and turn off the capacitance addition transistor by setting the gate voltage of the capacitance addition transistor to a second voltage, wherein the gate voltage is changed from the first voltage to the second voltage during a period when the signal from the amplifier transistor is output from the pixel via the select transistor, and wherein a voltage change amount per unit time when the gate voltage changes from the first voltage to the second voltage is smaller than a voltage change amount per unit time when the gate voltage changes from the second voltage to the first voltage.

Further features of the present invention will become apparent from the following description of exemplary embodiments with reference to the attached drawings.

BRIEF DESCRIPTION OF THE DRAWINGS

FIG. 1 is a block diagram of imaging device according to a first embodiment.

DESCRIPTION OF THE EMBODIMENTS

Figure 2:
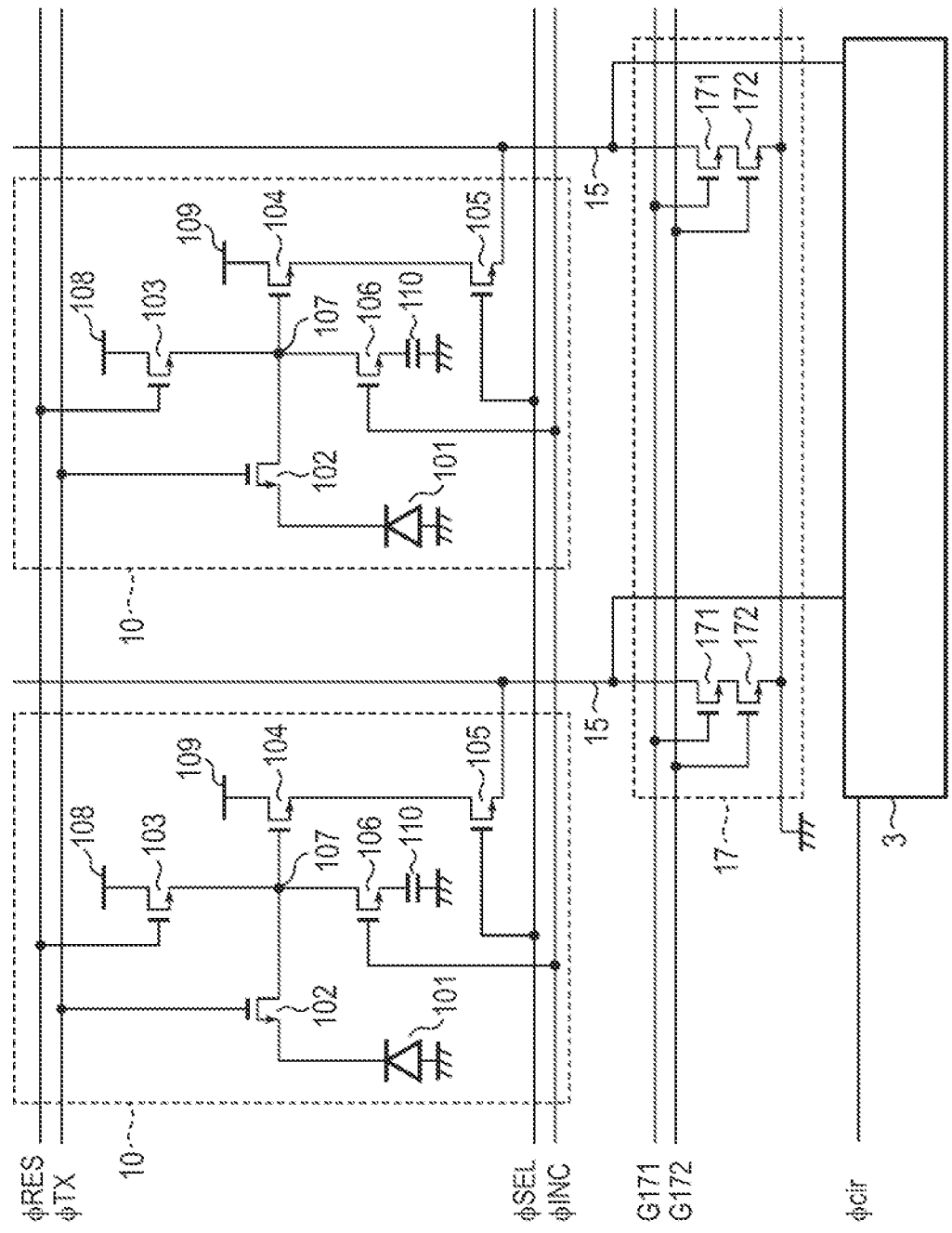
FIG. 2 is an equivalent circuit diagram of a pixel according to the first embodiment.

Preferred embodiments of the present invention will now be described in detail in accordance with the accompanying drawings. In the explanations of the respective embodiments, the same components as those in the other embodiments are labeled with the same references, and the description thereof may be simplified. In the following explanations, it is assumed that each of switches are formed of an n-channel MOS (Metal-Oxide-Semiconductor) transistor, unless otherwise noted. On-state of the switch indicates a conductive state of the n-channel MOS transistor in which a high level control signal is applied to the gate of the n-channel MOS transistor. Off-state of the switch indicates a nonconductive state of the n-channel MOS transistor in which a low level control signal is applied to the gate of the n-channel MOS transistor. The gate of the n-channel MOS transistor may be referred to as an input node, and the source and the drain of the n-channel MOS transistor may be referred to as a main node.

A p-channel MOS transistor may be used in place of the n-channel MOS transistor. In this case, potentials of a signals, e.g., a control signal, to be applied to the p-channel MOS transistor may be inverted with respect to the potential of the control signal applied to the n-channel MOS transistor. The switch may be formed of a CMOS (Complementary Metal-Oxide-Semiconductor) switch including an n-channel MOS transistor and a p-channel MOS transistor. Other elements (switch, buffer, and the like) may be provided on an electric path connecting between the plural circuit elements.

First Embodiment

FIG. 1 is a block diagram of an imaging device according to the present embodiment. An imaging device is a CMOS image sensor, for example, and includes a pixel array 1, a vertical scanning circuit 2, a column readout circuit 3, a horizontal scanning circuit 4, an output circuit 5, and a timing generation circuit 6.

The pixel array 1 includes a plurality of pixels 10 arranged in a matrix, and each of the plurality of pixels 10 includes a photoelectric converter that generates and accumulates a signal charge in response to an incident light. Note that, in the present specification, a row direction indicates a horizontal direction D2 in FIG. 1, and a column direction indicates a vertical direction D1 in FIG. 1. The m×n pixels 10 arranged in rows R1 to Rn and columns C1 to Cm are indicated in FIG. 1. A micro lens and a color filter may be provided over each of the plurality of pixels 10. The color filter may be a primary color filter of red, blue, and green, which are provided over the pixels 10 according to Bayer arrangement. A part of the plurality of pixels 10 is light-shielded as an OB pixel (optical black pixel). The plurality of pixels 10 may be provided with a distance measurement row in which focus detection pixels outputting pixel signals for detecting a focal point are arranged and a plurality of imaging rows in which imaging pixels outputting pixel signals for generating an image are arranged. A column signal line 15 is provided for each column of the pixels 10, and the pixels 10 on the same column output a pixel signal to the common column signal line 15.

The vertical scanning circuit 2 may be formed of a shift register, gate circuit, buffer circuit, and the like, and outputs a control signal via a signal line 16 to the pixels 10 a control signal based on a vertical synchronization signal, a horizontal synchronization signal, clock signal, and the like, to thereby control the pixels 10 on a row basis.

The column readout circuit 3 is connected to each of the column signal lines 15, amplifies the pixel signal on each column signal line 15, and performs an AD (Analogue to Digital) conversion. The AD conversion unit of the column readout circuit 3 may be formed of a comparator that compares a pixel signal with a reference signal, a memory that holds the comparison result and a count signal, and the like.

The horizontal scanning circuit 4 includes a decoder and a shift register, sequentially reads out a count value held in the memory of the column readout circuit 3 as a digital signal, and outputs the digital signal to a signal processing unit provided inside or outside of a chip (the imaging device). The signal processing unit includes a digital signal processor, and performs a digital signal processing, such as a digital gain processing, digital correlated double sampling processing, digital offset processing, and linearity correction processing.

The output circuit 5 includes a serial output circuit of LVDS (Low Voltage Differential Signaling) system, and outputs the processed digital signal to outside of the imaging device with high speed and low power consumption.

The timing generation circuit 6 generates various control signals and driving signals based on the clock signal and the synchronization signals, and controls the vertical scanning circuit 2, the column readout circuit 3, the horizontal scanning circuit 4, and the output circuit 5. Further, the timing generation circuit 6 may be provided with a reference signal output circuit that generates a reference signal (ramp signal) that changes a voltage with lapse of and a count circuit that generates a count signal synchronized with the reference signal. The counter circuit starts counting at the same time of changing of the potential of the reference signal, and supplies the count signal to the column readout circuit 3. The column readout circuit 3 may hold in the memory the count signal at the timing when the magnitude relationship between the pixel signal and the reference signal is inverted, and output the count signal as the digital signal after AD conversion.

FIG. 2 is au equivalent circuit diagram of the pixel according to the present embodiment, and indicates the pixels 10 arranged on the two columns adjacent to each other (column C1, C2, for example) on arbitrary one row of the pixel array 1. Each of the pixels 10 includes a photoelectric converter 101, a transfer transistor 102, a reset transistor 103, an amplifier transistor 104, a select transistor 105, a capacitance addition transistor 106, a FD portion (a floating diffusion region) 107, and a capacitor (a capacitor unit) 110. The photoelectric convener 101 may be formed of a photodiode, for example, and performs photoelectric conversion by an incident light and accumulation of charge. Note that the photoelectric converter 101 is not limited to the photodiode, and may be a configuration that provides a photoelectric effect, such as a photoelectric conversion film of an organic material, a photogate, and the like. The number of photoelectric converters 101 for one pixel 10 is not limited to one, and 2, 4, or more of photoelectric converters 101 may share one micro lens. Further, dark current noise may be reduced by configuring a buried photodiode. A micro lens is provided over the photoelectric converter 101, and a light condensed by the micro lens is introduced into the photoelectric convener 101.

The transfer transistor 102 is provided correspondingly to the photoelectric converter 101, and the gate of which is applied with a control signal φTX from the vertical scanning circuit 2. When the control signal φTX is a high level, the transfer transistor 102 is in the on-state (conductive state), and the signal charge accumulated in the photoelectric converter 101 is transferred to the FD portion 107 provided at the gate (input node) of the amplifier transistor 104. Further, when the control signal φTX is a low level, the transfer transistor 102 is in the off-state (nonconductive stale). By turning on or off the transfer transistor 102, the signal charge in the photoelectric converter 101 may be transferred to the FD portion 107. The FD portion 107 includes a prescribed capacitance, and a voltage of the FD portion 107 becomes a value corresponding to the capacitance and the signal charge.

The drain of the amplifier transistor 104 is connected to a power supply voltage line 109, and the amplifier transistor 104 operates as a source follower. The amplifier transistor 104 outputs a signal voltage corresponding to a gate voltage, namely the voltage of the FD portion 107 to the source.

The select transistor 105 is provided between the amplifier transistor 104 and the column signal line 15. When the control signal φSEL is a high level, the select transistor 105 is in the on-state, and the signal voltage is output from the source of the amplifier transistor 104 to the column signal line 15 via the select transistor 105. When the control signal φSEL is a low level, the select transistor 105 is in the off-state, and the source of the amplifier transistor 104 is electrically disconnected from the column signal line 15.

The source of the reset transistor 103 is connected to the FD portion 107, the drain of which is connected to the power supply voltage line 108, and the gate of which is applied with a control signal φRES from the vertical scanning circuit 2. When the control signal φRES is a high level, the reset transistor 103 is in the on-state, and the power supply voltage is applied to the FD portion 107.

A capacitance addition transistor 106 is provided between the capacitor 110 and the FD portion 107. The drain (first main node) of capacitance addition transistor 106 is connected to the FD portion 107, and the source (second main node) of which is connected to one electrode of the capacitor 110. The other electrode of the capacitor 110 is connected to the ground line. The capacitor 110 may be a capacitor element having a MOS structure, capacitor element having a polycrystalline silicon electrode, or a parasitic capacitor, regardless of the type as long as the capacitance component is provided. When the source of the capacitance addition transistor 106 is electrically released, the parasitic capacitance added to the source becomes the capacitor 110.

The gate of the capacitance addition transistor 106 is applied with a control signal φINC from the vertical scanning circuit 2. When the control signal φINC is a high level, the capacitance addition transistor 106 is in the on-state, and the one electrode of the capacitor 110 is electrically connected to the FD portion 107. The capacitance of the capacitor 110 is added to the capacitance of the FD portion 107, whereby retainable charge in the FD portion 107 is increased. Further, in addition to the capacitor 110, a capacitance of each terminal of the capacitance addition transistor 106 is added to the capacitance of the FD portion 107. For example, when the capacitance addition transistor 106 is turned on, a capacitance of a capacitor (MOS capacitor) formed by a channel formation of the capacitance addition transistor 106 is added to the capacitance of the FD portion 107. Further, the capacitance of each terminal of the capacitance addition transistor 106 is added to the capacitance of the FD portion 107. For example, a capacitance between the gate electrode and the other terminal, a p-n junction capacitance of a semiconductor region forming the other terminal, a capacitance between the other terminal and neighboring interconnections, and the like may be added to the capacitance of the FD portion 107. The capacitance of the FD portion 107 is increased in this way, whereby the retainable charge in the FD portion 107 is increased and the dynamic range may be expanded. The value of the capacitance added to the FD portion 107 may be appropriately determined according to the design of the capacitance addition transistor 106 in addition to the capacitor 110, the arrangement of the other interconnections, and the like.

On the other hand, when the control signal φINC is a low level and the capacitance addition transistor 106 is turned off, the other electrode of the capacitor 110 is disconnected from the FD portion 107, and the capacitor 110 is not added to the FD portion 107. In the FD portion 107, the amount of change in voltage with respect to one charge, that is, the charge-voltage conversion efficiency is increased, whereby the sensitivity can be increased. By turning the capacitance addition transistor 106 on or off in this way, it is possible to switch the capacitance value of the FD portion 107 and appropriately change the sensitivity and the dynamic range.

The column signal line 15 is electrically connected to the current source 17, and the current source 17 supplies a constant bias current to the source of the amplifier transistor 104 via the column signal line 15. The current source 17 includes transistors 171, 172 connected in series. The drain of the transistor 171 is connected to the column signal line 15, and the source of which is connected to the drain of the transistor 172. The source of the transistor 172 is connected to the ground line. The gates of the transistors 171, 172 of each column are respectively applied with control signals G171, G172 from the vertical scanning circuit 2. As described above, the plurality of transistors 171, 172 are connected in series between the power supply voltage and ground voltage. Therefore, the voltage between the source and drain of each of the transistors 171, 172 becomes low, and the noise caused by hot carriers may be suppressed.

Note that, the number of transistors constituting the current source 17 of each row is not limited, and may be 3 or more or 1 transistor.

A control signal φcir from the timing generation circuit 6 is input to the column readout circuit 3. The column readout circuit 3 holds a signal on the column signal line 15 in accordance with the control signal φcir. For example, at a timing when the control signal φcir transitions from a high level to a low level, the column readout circuit 3 may be hold the signal on the column signal line 15.

Figure 3:
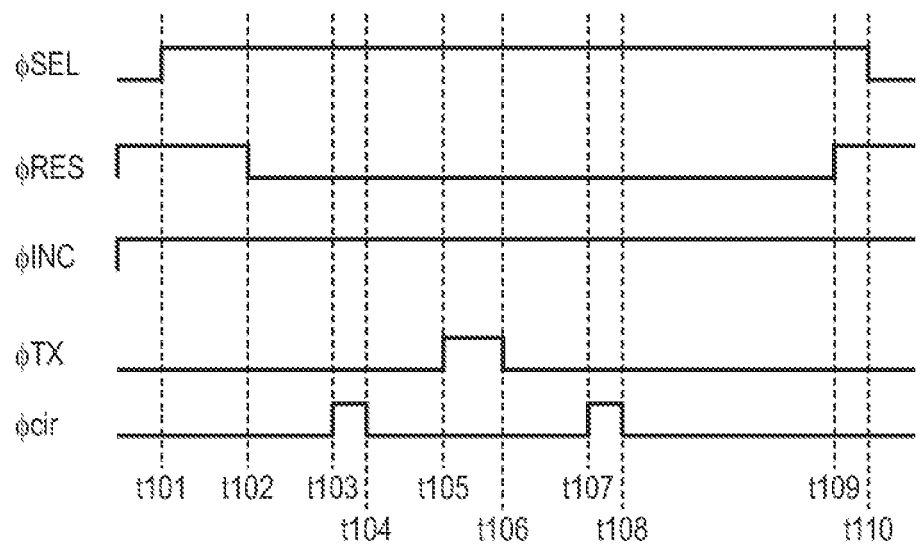
FIG. 3 is a timing chart of the imaging device according to the first embodiment.

FIG. 3 is a timing chart of the imaging device according to the present embodiment, and represents the state of the potential of each of the control signals φSEL, φRES, φINC, φTX, and φcir, each representing a first voltage VH of a high level at which corresponding transistor is turned on and a second voltage VL of a low level at which the corresponding transistor is turned off. Here, the first voltage VH and the second voltage VL have the relationship of VH>VL. Further, the rising and falling edges of the waveform of each control signal are represented as steep waveform changes, but in reality, they change in a predetermined time according to the parasitic resistance and the capacitance of the interconnections and the elements.

Before time t101, the control signals φSEL and φTX are at the low level, and the select transistor 105 and the transfer transistor 102 are in the off-state. The control signal φINC is at the high level, and the capacitance addition transistor 106 is in the on-state, whereby the capacitance of the capacitor 110 and the capacitances of each park of the capacitance addition transistor 106 are added to the FD portion 107. The control signal φRES is at the high level, and the reset transistor 103 is in the on-state, whereby the power supply voltage is supplied to the FD portion 107, and the FD portion 107, the capacitance addition transistor 106, and the capacitor 110 are reset. Further, the control signal φcir is at the low level, and the column readout circuit 3 does not hold the signal on the column signal line 15.

At time t101, the control signal φSEL transitions from the low level to the high level, and the select transistor 105 is in the on-state. The signal from the amplifier transistor 104 is output from the pixel 10 via the select transistor 105. That is, the source of the select transistor 105 is electrically connected to the column signal line 15, and the pixel 10 is in a selected state.

At time t102, the control signal φRES transitions from the high level to the low level, and the reset transistor 103 is turned off, whereby the reset of the FD portion 107 is completed. The control signal φINC maintains the high level state, and the capacitance is added to the FD portion 107. A signal (hereinafter, referred to as "reset signal") corresponding to the potential at the time of resetting of the FD portion 107 is output to the column signal line 15.

At time t103, the control signal φcir transitions from the low level to the high level. At time t104, when the control signal φcir transitions from the high level to the low level, the column readout circuit 3 holds the reset signal on the column signal line 15. The column readout circuit 3 performs AD conversion of the held reset signal and outputs a digital signal corresponding to the reset signal.

At a period from time t105 to time t106, the control signal φTX becomes the high level and the transfer transistor 102 is in the on-state. The charge accumulated in the photoelectric converter 101 is transferred to the FD portion 107 via the transfer transistor 102, and the potential of the FD portion 107 becomes lower according to the transferred charge. Here, since the capacitance addition transistor 106 is maintained in the on-state, the amount of charge that can be held in the FD portion 107 is increased, and the dynamic range can be expanded. A signal (detection signal) corresponding to the charge at the time of photoelectric conversion is output to the column signal line 15.

At a period from time t107 to time t108, the control signal φcir becomes the high level, and the column readout circuit 3 holds the detection signal on the column signal line 15. The column readout circuit 3 performs AD conversion of the held detection signal and outputs a digital signal corresponding to the detection signal.

At time t109, the control signal φRES transitions from the low level to the high level, and the reset transistor 103 is in the on-state, whereby the FD portion 107, the capacitance addition transistor 106, and the capacitor 110 are reset.

At time t110, the control signal φSEL transitions from the high level to the low level, and the select transistor 105 is in the off-state. The amplifier transistor 104 is electrically disconnected from the column signal line 15, and the pixel 10 is in a non-selected state. After that, the difference signal between the digital signal corresponding to the reset signal and the digital signal corresponding to the detection signal is calculated, and a signal from which the noise component is removed is obtained. The calculation of the difference signal may be performed inside the chip or outside the chip.

In FIG. 3, since the control signal φINC is at the high level, in addition to the capacitor 110, a region including a channel formed under the gate of the capacitance addition transistor 106 is also added to the capacitance of the FD portion 107. Therefore, the amount of charge held by the FD portion 107 is increased, and the dynamic range of the FD portion 107 may be expanded.

Figure 4:
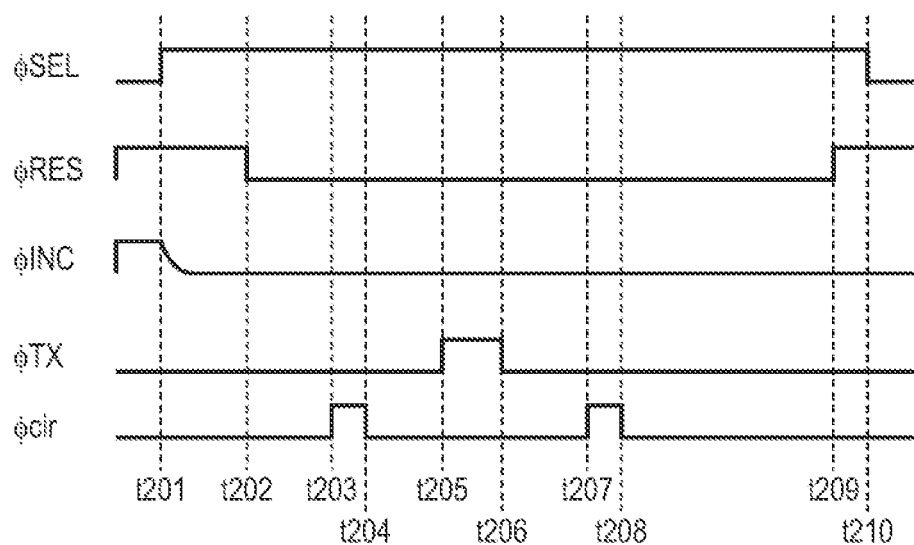
FIG. 4 is a timing the imaging device according to the first embodiment.

FIG. 4 is a timing chart of the imaging device according to the present embodiment, which is different from the timing chart of FIG. 3 in that the capacitance addition transistor transitions from the on-state to the off-state.

Before time t201, the control signals φSEL and φTX are at the lox level, and the select transistor 105 and the transfer transistor 102 are in the off-state. The control signal φINC is at the high level, and the capacitance addition transistor 106 is in the on-state. The control signal φRES is at the high level, and the reset transistor 103 is in the on-state, whereby the power supply voltage is supplied to the FD portion 107, and the FD portion 107, the capacitance addition transistor 106, and the capacitor 110 are reset. Further, the control signal φcir is at the low level, and the column readout circuit 3 does not hold the signal on the column signal.

At time t201, the control signal φSEL transitions from the low level to the high level, and the select transistor 105 is in the on-state, whereby the signal from the amplifier transistor 104 is output from the pixel 10 via the select transistor 105. Further, at time t201, the control signal φINC transitions from the high level to the low level. The capacitance addition transistor 106 changes from the on-state to the off-state and the reset state of the capacitance addition transistor 106 and the capacitor 110 is released. Here, the amount of voltage change per unit time from the high level to the low level of the control signal φINC is smaller than the amount of voltage change per unit time from the low level to the high level. Note that the timing of releasing the reset state of the capacitance addition transistor 106 does not necessarily have to be time t201, but it is desirable that the timing of releasing the reset state of the capacitance addition transistor 106 is within a period that the reset transistor 103 is in the on-state. By resetting the capacitor 110, it is possible to prevent undesired charge mixed in the capacitor 110 from leaking (overflowing) to the FD portion 107 and affecting the image quality.

At time t202, the control signal φRES transitions from the high level to the low level, and the reset transistor 103 is in the off-state, whereby the reset of the FD portion 107 is completed. At this time, since the capacitance addition transistor 106 is in the off-state, the capacitances are not added to the FD portion 107. Therefore, the capacitance of the FD portion 107 is smaller than the capacitance of the FD portion 107 when the capacitance addition transistor 106 is in the on-state.

At time t203, the control signal φcir transitions from the low level to the high level. At time t204, when the control signal φcir transitions from the high level to the low level, the column readout circuit 3 holds the reset signal on the column signal line 15. The column readout circuit 3 performs AD conversion of the held reset signal and outputs a digital signal corresponding to the reset signal.

At a period from time t205 to time t206, the control signal φTX becomes the high level and the transfer transistor 102 is in the on-state. The charge accumulated in the photoelectric converter 101 is transferred to the FD portion 107 via the transfer transistor 102, and the potential of the FD portion 107 becomes lower according to the transferred charge. Here, the capacitance addition transistor 106 is maintained in the off-state. Therefore, the change in the potential in the FD portion 107 is larger than the change in the potential when the capacitance is added to the FD portion 107. A signal (detection signal) corresponding to the charge at the time of photoelectric conversion is output to the column signal line 15.

At a period from time t207 to time t208, the control signal φcir becomes the high level, and the column readout circuit 3 holds the detection signal on the column signal line 15. A column readout circuit 3 performs AD conversion of the held detection signal and outputs a digital signal corresponding to the detection signal.

At time t209, the control signal φRES transitions from the low level to the high level, and the reset transistor 103 is in the on-state, whereby the FD portion 107 is reset. At time t210, the control signal φSEL transitions from the high level to the low level, and the select transistor 105 is in the off-state. The amplifier transistor 104 is electrically disconnected from the column signal line 15, and the pixel 10 is in a non-selected state.

In the readout period of FIG. 4 (a period from time t202 to time t210), the capacitance addition transistor 106 is in the off-state. Therefore, the capacitance of the FD portion 107 is smaller than the capacitance of the FD portion 107 in the readout period of FIG. 3 (a period from time t102 to time t110), and the readout operation may be performed in a state where the charge-voltage conversion efficiency of the FD portion 107 is high. That is, the change in the potential with respect to the charge in the FD portion 107 (amplitude) becomes large. Therefore, the sensitivity can be improved when the signal charge is small, such as in the case of photographing a low-luminance object.

Further, in the present embodiment, when the reset state of the capacitance addition transistor 106 is released (time t201), the control signal φINC is controlled so that the voltage change amount per unit time from the high level to the low level becomes small. As a result, it is possible to reduce the leakage of unwanted charges to the FD portion 107 and to avoid image quality deterioration. Hereinafter, the reason why image quality deterioration occurs and the effect of the present embodiment mill be described in detail.

Suppose that the control signal φINC changes from the high level to the to level at a high speed. In this case, when the capacitance addition transistor 106 transitions from the on-state to the off-state, the charge in the channel region is distributed to the source or drain of the capacitance addition transistor 106, and the charge distributed to the source is injected into the capacitor 110. The injected charge is mainly the charge in the channel region of the capacitance addition transistor 106 in the on-state. In particular, in the pixel 10 near the vertical scanning circuit 2, since the falling waveform of the control signal φINC is steep, charge injection to the capacitor 110 tends to occur. Further, the charge injection into the capacitor 110 may also be significant in the capacitance addition transistor 106 having a large gate. In order to expand the dynamic range, the gate size of the capacitance addition transistor 106 may be increased to increase the capacitance to be added. In this case, the amount of charge in the channel region when the capacitance addition transistor 106 is in the on-state may be increased, and the amount of charge injected into the capacitor 110 when the reset state is released may also be increased. The charge injected into the capacitor 110 leaks to the FD portion 107 during the signal readout period, and may cause image quality deterioration. For example, when the charge is transferred from the photoelectric converter 101 to the FD portion 107, the potential of the FD portion 107 may become too low, resulting in signal saturation.

In the present embodiment, the signal waveform of the control signal φINC is controlled so that the voltage change amount per unit time from the high level to the low level of the gate voltage of the capacitance addition transistor 106 becomes small. Therefore, the charge in the channel region of the capacitance addition transistor 106 in the on-state is easily discharged to the low impedance side. When the reset transistor 103 is in the on-state, the FD portion 107 is electrically connected to the power supply voltage line 108 via the reset transistor 103, and the impedance of the FD portion 107 becomes lower than the impedance of the capacitor 110. The charge of the capacitance addition transistor 106 is easily discharged to the FD portion 107, the charge injection to the capacitor 110 is suppressed, and the leakage of the charge from the capacitor 110 to the FD portion 107 may be reduced. Therefore, according to the present embodiment, charge injection into the capacitor 110 may be suppressed at the time of releasing the reset state, whereby an image with little deterioration may be obtained.

Second Embodiment

Figure 5:
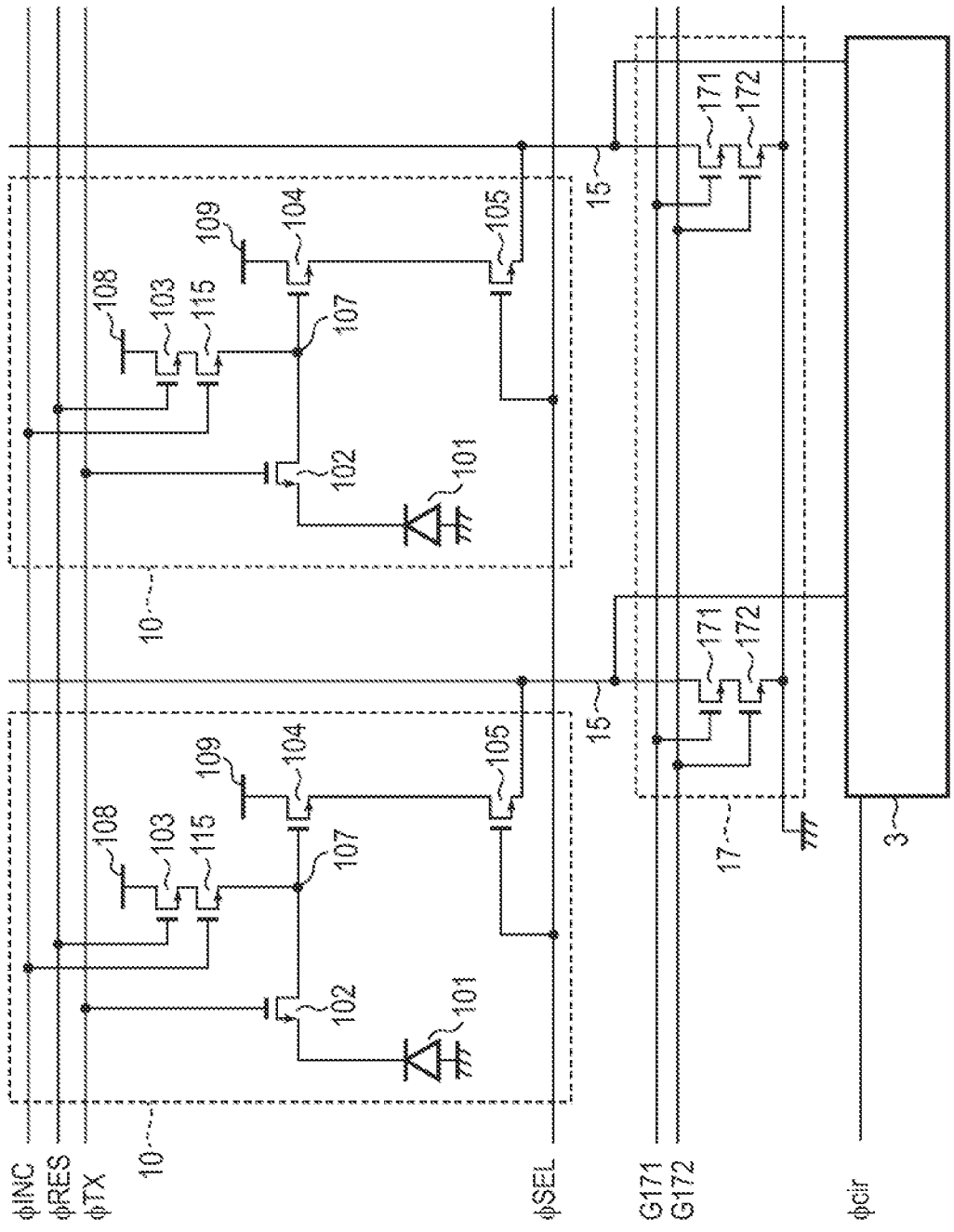
FIG. 5 is an equivalent circuit diagram of a pixel according to a second embodiment.

Next, an imagine device according to the present embodiment will be described. FIG. 5 is an equivalent circuit diagram of a pixel according to the present embodiment. Hereinafter, the imagine device according to the present embodiment will be described with reference to the same reference numerals for the same configurations as those in the first embodiment and focusing on configurations different from those in the first embodiment.

In FIG. 5, the capacitance addition transistor 115 is provided in an electrical path between the reset transistor 103 and the FD portion 107. That is, the drain of the capacitance addition transistor 115 is connected to the source of the reset transistor 103, and the source of the capacitance addition transistor is connected to the FD portion 107. A control signal φINC is applied to the gate of the capacitance addition transistor 115. When the control signal φINC becomes the high level, the capacitance addition transistor 115 is in the on-state, whereby the FD portion 107 is electrically connected to the reset transistor 103 via the capacitance addition transistor 115. When the control signal φINC is at the low level, the capacitance addition transistor 115 is in the off-state, and the capacitance of the capacitance addition transistor 115 is not added to the FD portion 107.

Figure 6:
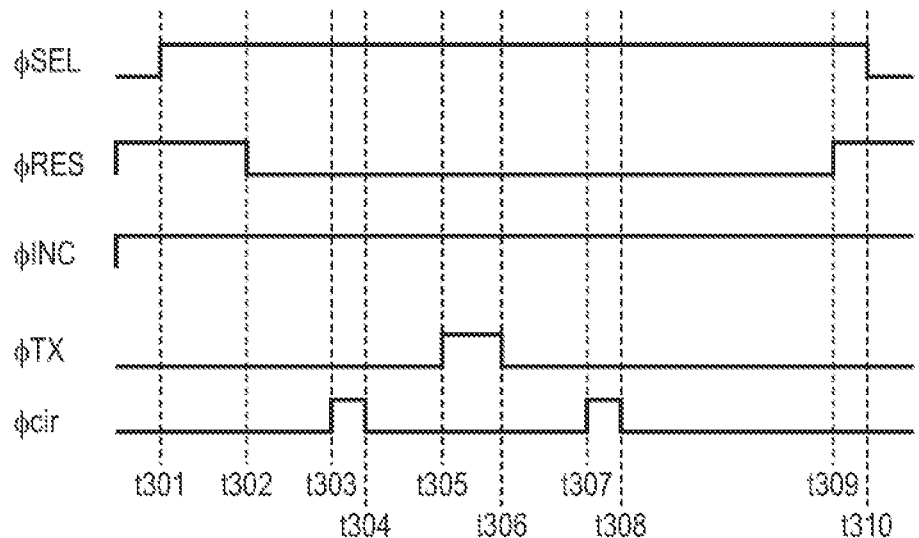
FIG. 6 is a timing chart of an imaging device according to the second embodiment.
Figure 7:
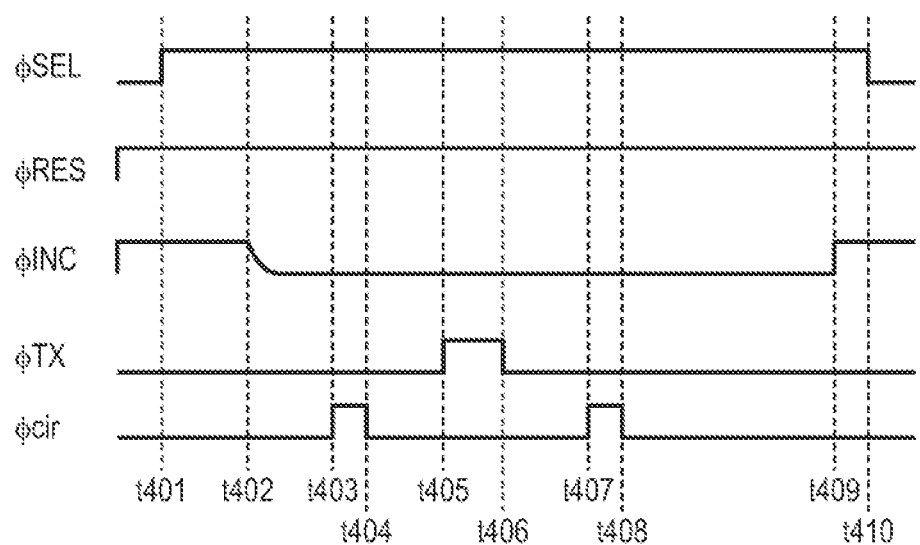
FIG. 7 is a timing chart of the imaging device according to the second embodiment.

FIG. 6 and FIG. 7 are timing charts of the imaging device according to the present embodiment. As in FIG. 3 and FIG. 4, FIG. 6 and FIG. 7 show the states of the potentials of the control signals φSEL, φRES, φINC, φTX, and φcir. Hereinafter, the operation of the timing charts of FIG. 7 and FIG. 8 different from that of the timing charts of FIG. 3 and FIG. 4 will be mainly described.

FIG. 6 illustrates the operation of the imaging device in which the capacitance addition transistor 115 is in the on-state. From time t301 to time t310, the control signal φINC is at the high level and the capacitance addition transistor 115 remains the on-state. At a period from time t301 to t302, the control signal φRES is at the high level, and the reset transistor 103 is in the on-state. The power supply voltage is supplied to the FD portion 107 via the capacitance addition transistor 115, and the FD portion 107 is reset.

At a period from time t302 to time t309, the control signal φRES is at the low level, and the reset transistor 103 is in an off-state. Here, since the capacitance addition transistor 115 is kept in the on-state, the capacitance of the capacitance addition transistor 115 is added to the FD portion 107. At a period from time t305 to time t306, the control signal φTX becomes the high level, and the transfer transistor 102 is in the on-state. The charge accumulated in the photoelectric converter 101 is transferred to the FD portion 107 via the transfer transistor 102, and the potential of the FD portion 107 is lowered in accordance with the transferred charge. Here, since the capacitance addition transistor 115 is kept in the on-state, the amount of charge that may be held in the FD portion 107 is increased, and the dynamic range may be expanded.

At a period from time t307 to time t308, the control signal φcir becomes the high level, and the column readout circuit 3 holds the detection signal on the column signal line 15. At time t309, the control signal φRES transitions from the low level to the high level, and the reset transistor 103 is in the on-state, whereby the FD portion 107 is reset.

FIG. 7 illustrates the operation of the imaging device in which the capacitance addition transistor 115 transitions from the on-state to the off-state. Before time t401, the control signals φSEL, φTX, and φcir are at the low levels. The control signal φINC is at the high level, and the capacitance addition transistor 115 is in the on-state. The control signal φRES is at the high level, and the reset transistor 103 is in the on-state. The power supply voltage is supplied to the FD portion 107 via the capacitance addition transistor 115, and the FD portion 107 is reset. At time t401, the control signal φSEL transitions from the low level to the high level, the select transistor 105 is in the ort-state, and the pixel 10 is in a selected state.

At time t402, the control signal φINC changes from the high level to the low level. The capacitance addition transistor 115 is turned from the in-state to the off-state, and the reset state of the FD portion 107 is released. The capacitance of the capacitance addition transistor 115 is not added to the FD portion 107, and the capacitance of the FD portion 107 is reduced.

At a period from time t403 to time t404, the control signal φcir is at the high level, and the column readout circuit 3 holds the reset signal on the column signal line 15. A column readout circuit 3 performs AD conversion of the held reset signal and outputs a digital signal corresponding to the reset signal. At a period from time t405 to time t406, control signal φTX becomes the high level, and the transfer transistor 102 is in the on-state. The charge accumulated in the photoelectric converter 101 is transferred to the FD portion 107 via the transfer transistor 102, and the potential of the FD portion 107 is lowered in accordance with the transferred charge. Since the capacitance addition transistor 115 is kept in the off-state, the capacitance of the FD portion 107 is reduced. Therefore, the change in the potential in the FD portion 107 is larger than the change in the potential when the capacitance is added to the FD portion 107. A signal corresponding to the charge at the time of photoelectric conversion (detection signal) is output to the column signal line 15. At a period from time t407 to time t408, the control signal φcir becomes the high level, and the column readout circuit 3 holds the detection signal on the column signal line 15. A column readout circuit 3 performs AD conversion of the held detection signal and outputs a digital signal corresponding to the detection signal.

At time t409, the control signal φINC transitions from the low level to the high level, and the capacitance addition transistor 115 is in the on-state. At this time, since the reset transistor 103 is kept in the on-state, the power supply voltage is supplied to the FD portion 107, and the FD portion 107 is reset. At time t410, the control signal φSEL transitions from the high level to the low level, and the select transistor 105 is in the off-state. The amplifier transistor 104 is electrically disconnected from the column signal line 15, and the pixel 10 is in a non-selected state.

In the readout period of FIG. 7 (a period from time t402 to time t409), the capacitance addition transistor 115 is in the off-state. Therefore, the capacitance of the FD portion 107 is smaller than that of the FD portion 107 in the readout period (a period from time t302 to time t310) of FIG. 6, and the readout operation may be performed in a state where the charge-voltage conversion efficiency of the FD portion 107 is high. That is, the change in the potential with respect to the charge in the FD portion 107 (amplitude) becomes large. Therefore, it is possible to improve the sensitivity in the case where the signal charge is small, such as in the case of photographing a dark low-luminance object.

Also in the present embodiment, when the reset state of the capacitance addition transistor 115 is released (time t402), charge injection from the capacitance addition transistor 115 to the FD portion 107 may occur. The injected charge is mainly the charge in the channel region of the capacitance addition transistor 115 in the on-state. When the capacitance addition transistor 115 transits from the on-state to the off-state, the charge in the channel region is distributed to the source or drain of the capacitance addition transistor 115, and the charge distributed to the source is injected into the FD portion 107. In particular, charge injection into the FD portion 107 may be significant in the capacitance addition transistor 115 having a large gate. The charge injected into the ED portion 107 lowers the potential of the FD portion 107 at the time of reset. Therefore, when the charge of the photoelectric converter 101 is transferred to the FD portion 107, the electric potential of the FD portion 107 may become too low to read out all the charge of the photoelectric converter 101. Further, the voltage range of the signal output from the pixel 10 may deviate from the operating voltage range of the column signal line 15. In this manner, the potential drop of the FD portion 107 due to the charge injection causes saturation of the signal, which may cause mage quality degradation.

The charge injection into the FD portion 107 at the time of releasing the reset state becomes remarkable especially in the pixel 10 illustrated FIG. 5. In FIG. 5, the capacitance addition transistor 115 is connected to the power supply voltage line 108 via the reset transistor 103. Since the capacitance addition transistor 115 is connected to the power supply side through the on-resistance of the reset transistor 103, the impedance on the power supply voltage line 108 side of the capacitance addition transistor 115, that is, on the drain side of the capacitance addition transistor 115 becomes higher than the impedance on the source side. As a result, when the capacitance addition transistor 115 transitions from the on-state to the off-state, it becomes difficult for charge to be discharged from the channel region to the side of the power supply voltage line 108, and on the contrary, much of the charge in the channel region is injected into the FD portion 107.

In the present embodiment as well, the above-described problem may be avoided by making the falling waveform of the control signal φINC applied to the gate of the capacitance addition transistor 115 blunt. The falling time of the control signal φINC is longer than the rising time. That is, the amount of voltage change per unit time until the gate voltage of the capacitance addition transistor 115 transitions from the high level to the low level is smaller than the amount of voltage change per unit time until the gate voltage transitions from the low level to the high level. By lengthening the time from the on-state to the off-state of the capacitance addition transistor 115, the influence of the on-resistance of the reset transistor 103 may be reduced. That is, the charge in the channel region of the capacitance addition transistor 115 is easily discharged to the power supply voltage line 108 via the reset transistor 103 in the on-state. Even if there is a delay due to the on-resistance of the reset transistor 103, by lengthening the time for the capacitance addition transistor 115 to transition from the on-state to the off-state, the charge from the channel region easily moves to the reset transistor 103, and the charge injection to the FD portion 107 is suppressed. This makes it possible to suppress charge injection into the FD portion 107 when the reset state is released, and to reduce image quality deterioration due to a signal saturation.

Third Embodiment

Figure 8:
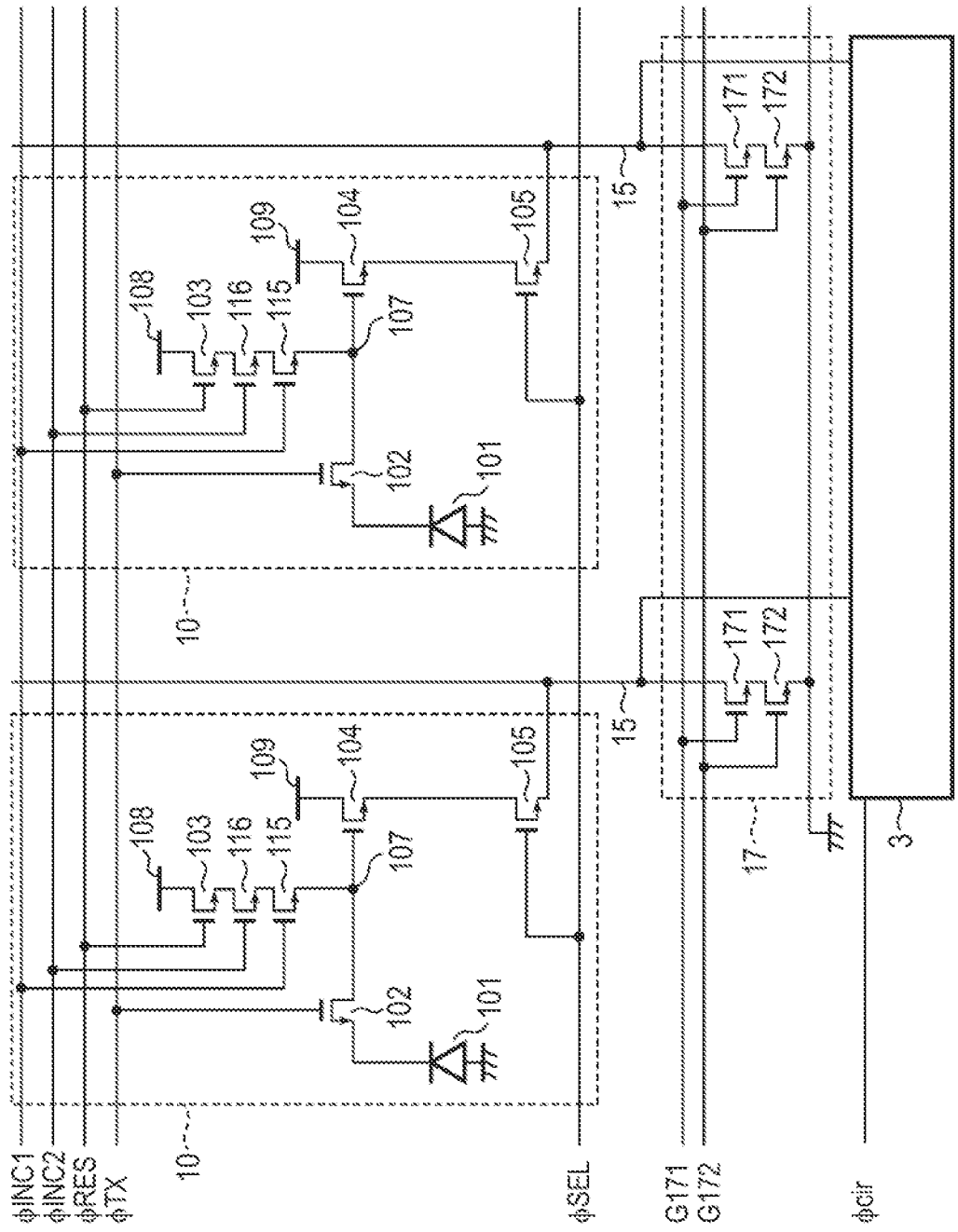
FIG. 8 is an equivalent circuit diagram of a pixel according to a third embodiment.

FIG. 8 is a block diagram of an equivalent circuit diagram of a pixel in the present embodiment. The pixel 10 according to the present embodiment includes a plurality of capacitance addition transistors. Hereinafter, the imaging device according to the present embodiment will be described mainly with reference to a configuration different from that of the second embodiment.

In FIG. 8, the pixel 10 includes a first capacitance addition transistor 115 and a second capacitance addition transistor 116. The capacitance addition transistor 116 is provided between the capacitance addition transistor 115 and the reset transistor 103. That is, the drain of the capacitance addition transistor 116 is connected to the sluice of the reset transistor 103, and the source of the capacitance addition transistor 116 is connected to the drain of the capacitance addition transistor 115. The source of the capacitance addition transistor 115 is connected to the FD portion 107. A control signal φINC1 is applied to the gate of the capacitance addition transistor 115, and a control signal φINC2 is applied to the gate of the capacitance addition transistor 116.

The reset transistor 103 may set the FD portion 107 to a reset potential via the two capacitance addition transistors 115, 116. By switching the on-state or off-state of the capacitance addition transistor 115, 116, the capacitance added to the FD portion 107 may be changed. For example, when the capacitance addition transistor 115 is in the off-state, the capacitance of the FD portion 107 is minimized.

When the capacitance addition transistors 115, 116 are in the on-state, the capacitance of the FD portion 107 becomes maximum. When the capacitance addition transistor 115 is in the on-state and the capacitance addition transistor 116 is in the off-state, the capacitance of the FD portion becomes an intermediate value. That is, according to the present embodiment, the capacitance of the FD portion 107 may be switched to cine of a maximum value, an intermediate value, and a minimum value.

Figure 9:
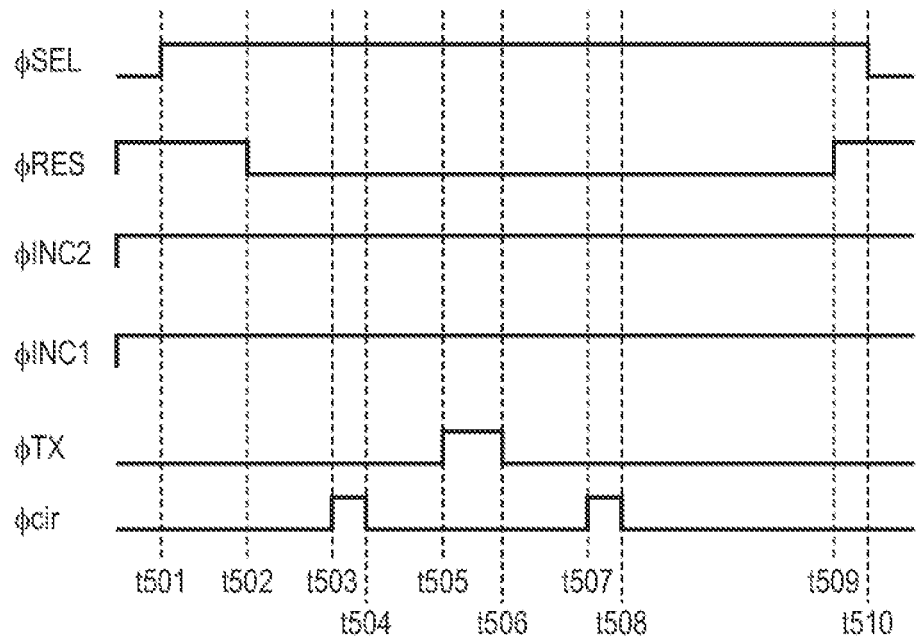
FIG. 9 is a timing chart of an imaging device according to the third embodiment.
Figure 10:
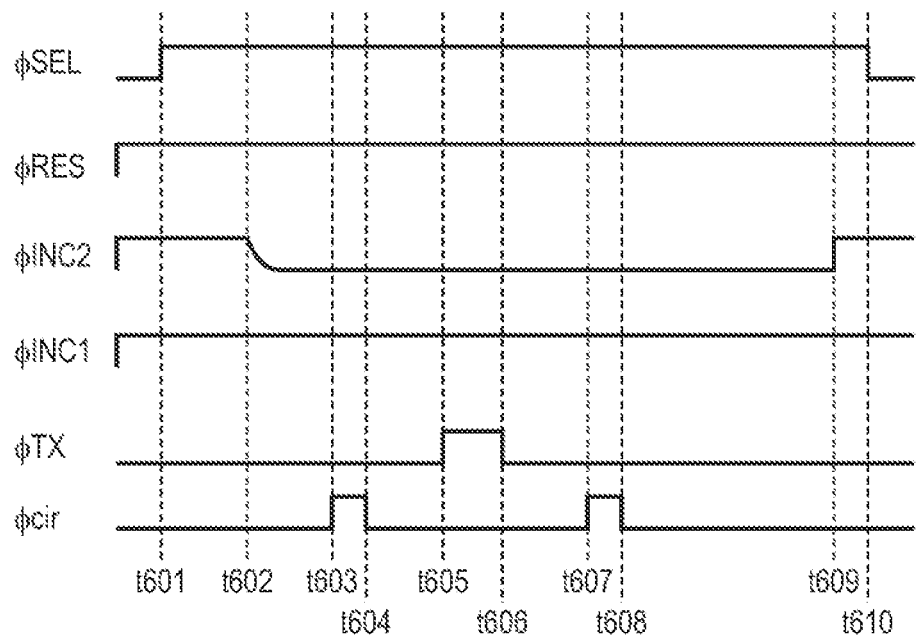
FIG. 10 is a timing chart of the imaging device according to the third embodiment.
Figure 11:
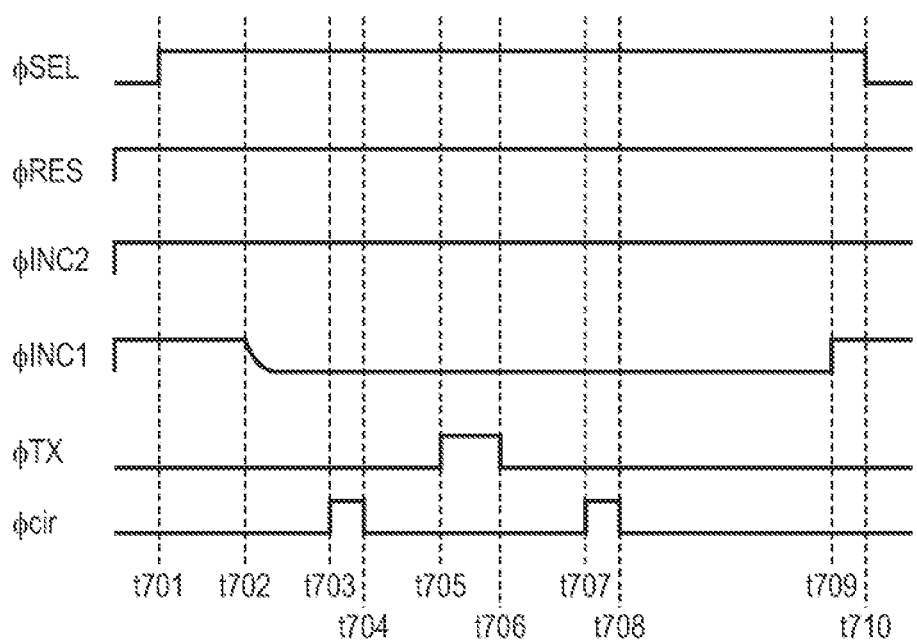
FIG. 11 is a timing chart of the imaging device according to the third embodiment.

FIG. 9, FIG. 10, and FIG. 11 are timing charts of the imaging device according to the present embodiment, and illustrate the states of the potentials of the control signals φSEL, φRES, φINC1, φTX, and φcir. Hereinafter, the operation of the timing charts of FIG. 9, FIG. 10 and FIG. 11 different from that of the timing charts of FIG. 6 and FIG. 7 will be mainly described.

FIG. 9 illustrates the operation of the imaging device when the capacitance of the FD portion 107 is maximized (first operation mode). From time t501 to time t510, the control signals φINC1 and φINC2 are at the high level, and the capacitance addition transistors 115, 116 are kept in the on-state. From before time t501 to time t502, the control signal φRES is at the high level, and the reset transistor 103 is in the on-state. The power supply voltage is supplied to the FD portion 107 via the capacitance addition transistors 115, 116, and the FD portion 107 is reset.

At a period from time t502 to time t509, the control signal φRES is at the low level and the reset transistor 103 is in the off-state. Since the capacitance addition transistors 115, 116 are kept in the on-state, the capacitances of the capacitance addition transistor 115, 116 are added to the FD portion 107, and the capacitance of the FD portion. 107 becomes maximum. At a period from time t505 to time t506, the control signal φTX becomes high level, and the transfer transistor 102 is in the on-state. The charge accumulated in the photoelectric converter 101 is transferred to the FD portion 107 via the transfer transistor 102, and the potential of the FD portion 107 is lowered in accordance with the transferred charge. Here, since the capacitance addition transistors 115, 116 are kept in the on-state, the amount of charge that can be held in the FD portion 107 is increased, and the dynamic range may be expanded.

At time t509, the control signal φRES transitions from the low level to the high level, and reset transistor 103 is in the on-state. At this time, since the capacitance addition transistors 115, 116 are kept in the on-state, the power supply voltage is supplied to the FD portion 107, and the FD portion 107 is reset.

FIG. 10 illustrates the operation of the imaging device (second operation mode) when the capacitance of the FD portion 107 is an intermediate value. Before time t601, the control signals φINC1 and φINC2 are at the high level, and the capacitance addition transistors 115, 116 are in the on-state. Since the control signal φRES is at the high level, the power supply voltage is supplied to the FD portion 107 via the capacitance addition transistors 115, 116, and the FD portion 107 is reset.

At time t602, the control signal φINC2 transitions from the high level to the low level. The capacitance addition transistor 116 is turned from the on-state to the off-state, and the reset state of the FD portion 107 is released. The control signal φINC1 maintains the high level, and the capacitance addition transistor 115 remains in the on-state. To the FD portion 107, the capacitance of the capacitance addition transistor 116 is not added, but the capacitance of the capacitance addition transistor 115 is added. That is, the capacitance of the FD portion 107 is an intermediate value.

At time t609, the control signal φINC2 transitions from the low level to the high level, and the capacitance addition transistor 116 is in the on-state. Since the reset transistor 103 is kept in the on-state, the power supply voltage is supplied to the FD portion 107, and the FD portion 107 is reset.

FIG. 11 illustrates the operation of the imaging device (third operation mode) when the capacitance of the FD portion 107 is minimized. Before time t701, the control signals φINC1 and φINC2 are at the high level, and the capacitance addition transistors 115, 116 are in the on-state. Since the control signal φRES is at the high level, the power supply voltage is supplied to the FD portion 107 via the capacitance addition transistors 115, 116, and the FD portion 107 is reset.

At time t702, the control signal φINC1 transitions from the high level to the low level. The capacitance addition transistor 115 is turned from the on-state to the off-state, and the reset state of the FD portion 107 is released. The control signal φINC2 remains at the high level, and the capacitance addition transistor 116 remains in the on-state. On the other hand, since the capacitance addition transistor 115 is in the off state, the capacitance addition transistors 115, 116 are electrically disconnected from the FD portion 107, and no capacitance is added to the FD portion 107. That is, the capacitance of the FD portion 107 is minimized, and the change in potential (amplitude) with respect to the charge in the FD portion 107 is maximized.

At time t709, the control signal φINC1 transitions from the low level to the high level, and the capacitance addition transistor 115 is in the on-state. Since the reset transistor 103 and the capacitance addition transistor 116 are kept in the on-state, the power supply voltage is supplied to the FD portion 107, and the FD portion 107 is reset.

As illustrated in FIG. 9, FIG. 10, and FIG. 11, the imaging device according to the present embodiment may selectively execute any one of the plurality of operation modes according to the on-state or off-state of each capacitance addition transistors 115, 116, and can switch the capacitance of the FD portion 107 to an one of the maximum value, the intermediate value, and the minimum value.

Also in the present embodiment, when the reset state of the capacitance addition transistors 115, 116 is released (time t602, t702), the falling waveforms of the control signals φINC1 and φINC2 blunted. That is, the amount of voltage change per unit time from the high level to the low level of each gate voltage of the capacitance addition transistor 115, 116 is smaller than the amount of voltage change per unit time from the low level to the high level of the gate voltage. Thus, charge injection from the capacitance addition transistors 115, 116 to the FD portion 107 may be suppressed, and a saturation of a signal caused by a potential drop of the FD portion 107 may be avoided. The falling time of only one of the control signals φINC1 and φINC2 may be increased. For example, the fall time of the gate voltage of only the capacitance addition transistor 115 directly connected to the FD portion 107 may be increased.

In the present embodiment, a plurality of capacitance addition transistors 115, 116 are provided between the reset transistor 103 and the FD portion 107. Therefore, compared with the second embodiment, the capacitance added to the FD portion 107 may be increased, and the dynamic range may be further expanded. In the second embodiment, in order to increase the capacitance added to the FD portion 107, it is necessary to increase the gate size of the capacitance addition transistor 115. However, when the gate size is increased, the amount of charge injected from the channel region to the FD portion 107 is increased at the time of releasing the reset state, and signal saturation tends to occur. According to the present embodiment, by using the plurality of capacitance addition transistors 115, 116, it is possible to increase the capacitance added to the FD portion 107 while reducing the gate sizes of the respective capacitance addition transistors. Therefore, compared with the second embodiment, it is possible to reduce charge injection from the channel region to the FD portion 107 at the time of reset while further expanding the dynamic range.

Fourth Embodiment

Figure 12:
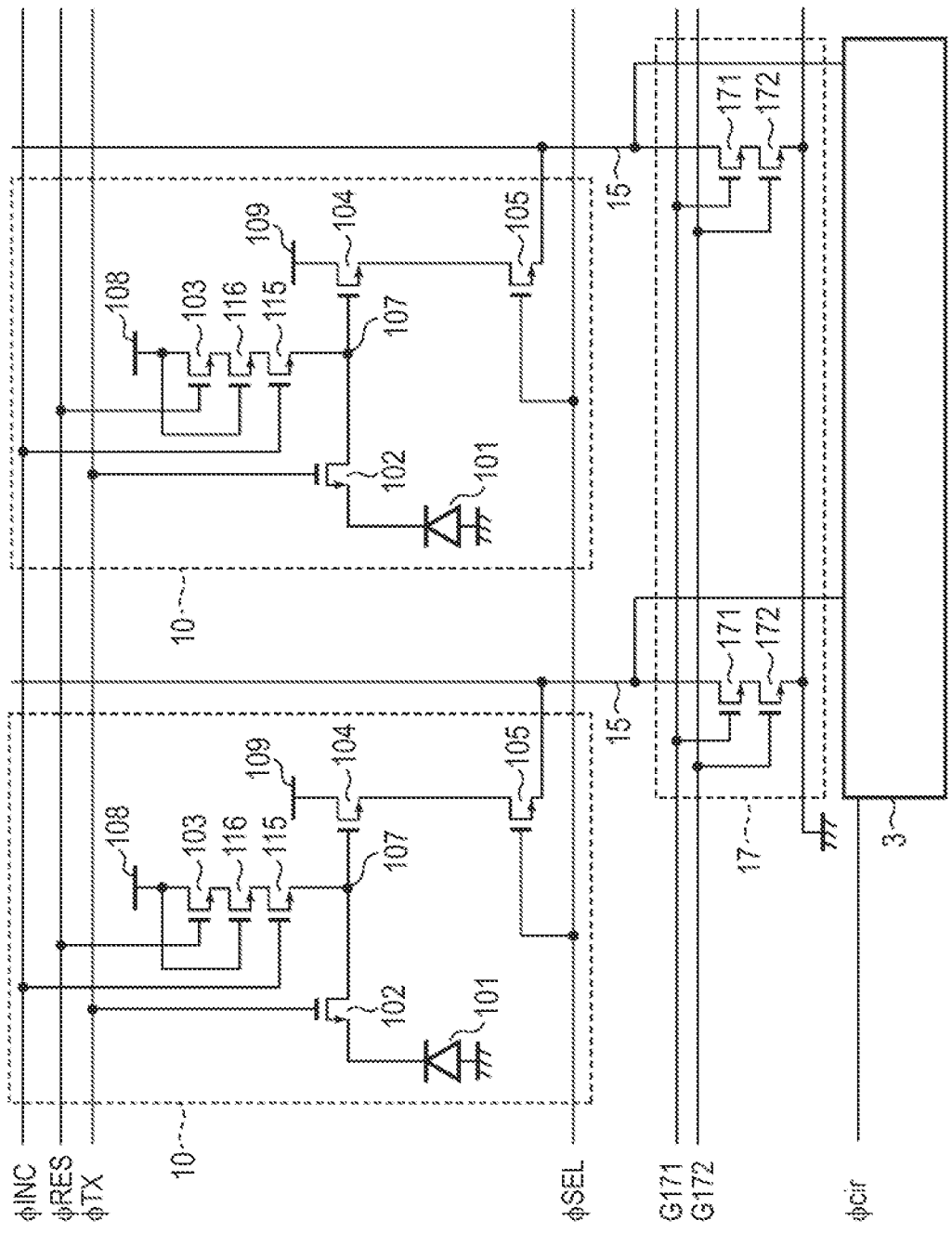
FIG. 12 is an equivalent circuit diagram of a pixel according to a fourth embodiment.

FIG. 12 is an equivalent circuit diagram of a pixel according to the present embodiment. The pixel 10 of the present embodiment is different from the pixel of the third embodiment in that the second capacitance addition transistor 116 is always in the on-state. Hereinafter, the imaging device according to the present embodiment will be described mainly with reference to a configuration different from that of the third embodiment.

In FIG. 12, the gate of the capacitance addition transistor 116 is connected to the power supply voltage line (first voltage line) 108, and the capacitance addition transistor 116 is always in the on-state. The voltage applied to the gate of the capacitance addition transistor 116 is not necessarily limited to the power supply voltage, and may be a voltage sufficient to turn on the capacitance addition transistor 116. A control signal ϕINC is applied to the gate of the capacitance addition transistor 115, and the capacitance addition transistor 115 may transition to the on state or the off-state according to the control signal ϕINC.

The operation of the imaging device according to the present embodiment is substantially the same as that illustrated in the timing charts of FIG. 6 and FIG. 7 in the second embodiment. That is, in FIG. 6, the control signal ϕINC is at the high level during the readout period, and the capacitance addition transistor 115 is in the on-state. When the reset transistor 103 is in the off-state (time t302 to time t309), the capacitances of the capacitance addition transistors 115, 116 are added to the FD portion 107. Thus, the capacitance added to the FD portion 107 is increased, and the dynamic range may be expanded. In FIG. 7, when the control signal ϕINC is at the low level (time t402 to time t409), the capacitance addition transistor 115 is in the off-state. To the FD portion 107, the capacitances of the capacitance addition transistors 115, 116 are not added, and the change of the potential with respect to the charge in the FD portion 107 (amplitude) becomes large.

In the present embodiment as well, the falling waveform of the control signal ϕINC is blunted when the reset state of the capacitance addition transistor 115 is released. That is, the voltage change amount per unit time until the gate voltage of the capacitance addition transistor 115 changes from the first voltage to the second voltage is smaller than the voltage change amount per unit time until the gate voltage changes from the second voltage to the first voltage. Therefore, the charge injection from the capacitance addition transistor 115 to the FD portion 107 is suppressed, and the saturation of the signal caused by the potential drop of the FD portion 107 may be avoided.

Further, since the plurality of capacitance addition transistors 115, 116 are provided, it is possible to increase the capacitance added to the FD portion 107 while reducing the gate size of the capacitance addition transistors 115, 116 in the same manner as in the third embodiment. In the present embodiment, the gate of the capacitance addition transistor 116 is connected to the power supply voltage line 108, so that it is not necessary to provide a control signal for driving the capacitance addition transistor 116. Therefore, in the pixel 10, the opening of the photoelectric converter 101 may be enlarged, and optical characteristics such as sensitivity may be improved.

Fifth Embodiment

Figure 13:
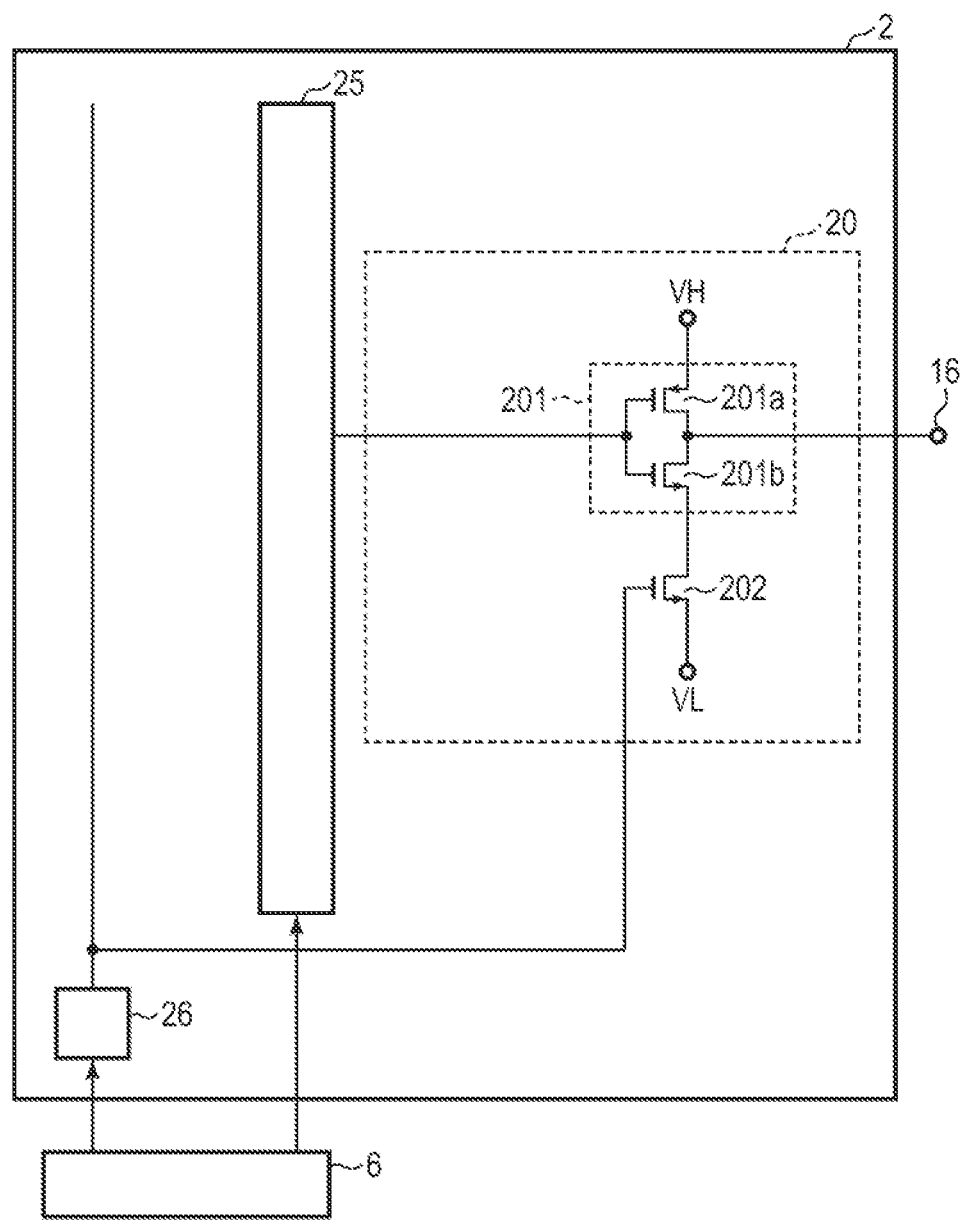
FIG. 13 is a block diagram of a vertical scanning circuit according to a fifth embodiment.

FIG. 13 is a block diagram of the vertical scanning circuit according to the present embodiment. The vertical scanning circuit 2 illustrated in FIG. 13 may be used in the imaging device according to the first to fourth embodiments, and may function as a driving circuit for driving the capacitance addition transistors 106, 115, 116.

The vertical scanning circuit 2 includes a buffer circuit 20, a scanning circuit 25, and a bias circuit 26. The buffer circuit 20 includes an inverter 201 and a transistor 202. The inverter 201 is comprised of a p-channel transistor (second transistor) 201a and an n-channel transistor (first transistor) 201b. The gates of the transistors 201a, 201b are connected to each other, and a signal from the scanning circuit 25 is input thereto. The drains of the transistors 201a, 201b are connected to each other and output a control signal to the signal line 16. A voltage VH is applied to the source of the transistor 201a. The voltage VH may be the power supply voltage on the power supply voltage line (first voltage line). The source of the transistor 201b is connected to the drain of the n-channel transistor 202. A bias voltage from the bias circuit 26 is applied to the gate of the transistor 202, and a voltage VL is applied to the source. The transistor 202 functions as a current source that defines the drive current of the inverter 201. The voltage VL may be a ground voltage in the ground interconnection (second voltage line).

The bias circuit 26 generates a bias voltage and supplies the bias voltage to the gate of the transistor 202 of the buffer circuit 20. The bias circuit 26 generates a predetermined bias voltage by using the voltage VL applied to the source of the transistor 202.

In the vertical scanning circuit 2 illustrated in FIG. 13, when the signal input to the inverter 201 transitions from the low level to the high level, the transistor 201a transitions from the on-state to the off-state, and the transistor 201b transitions from the off-state to the on-state. When the transistor 201b transitions to the on-state, the current flowing through the transistor 201b is restricted by the transistor 202. Therefore, the signal waveform when the output voltage of the inverter 201 changes from the voltage VH to the voltage VL is blunted, and the fall time becomes longer. On the other hand, when the signal input to the inverter 201 transitions from the high level to the low level, the transistor 201a transitions from the off-state to the on-state, and the transistor 201b transitions from the on-state to the off-state. The current flowing through the transistor 201a is not restricted by the transistor 202, and the output voltage of the inverter 201 changes from the voltage VL to the voltage VH in a short time. Therefore, in the capacitance addition transistor 106, 115, 116, the voltage change amount per unit time until the gate voltage changes from the voltage VL to the voltage VH is smaller than the voltage change amount per unit time until the gate voltage changes from the voltage VL to the voltage VH. By using the control signal ϕINC generated in this manner, charge injection from the capacitance addition transistor 106, 115, 116 to the FD portion 107 in the first to fourth embodiments may be suppressed, and image quality degradation may be reduced.

Sixth Embodiment

Figure 14:
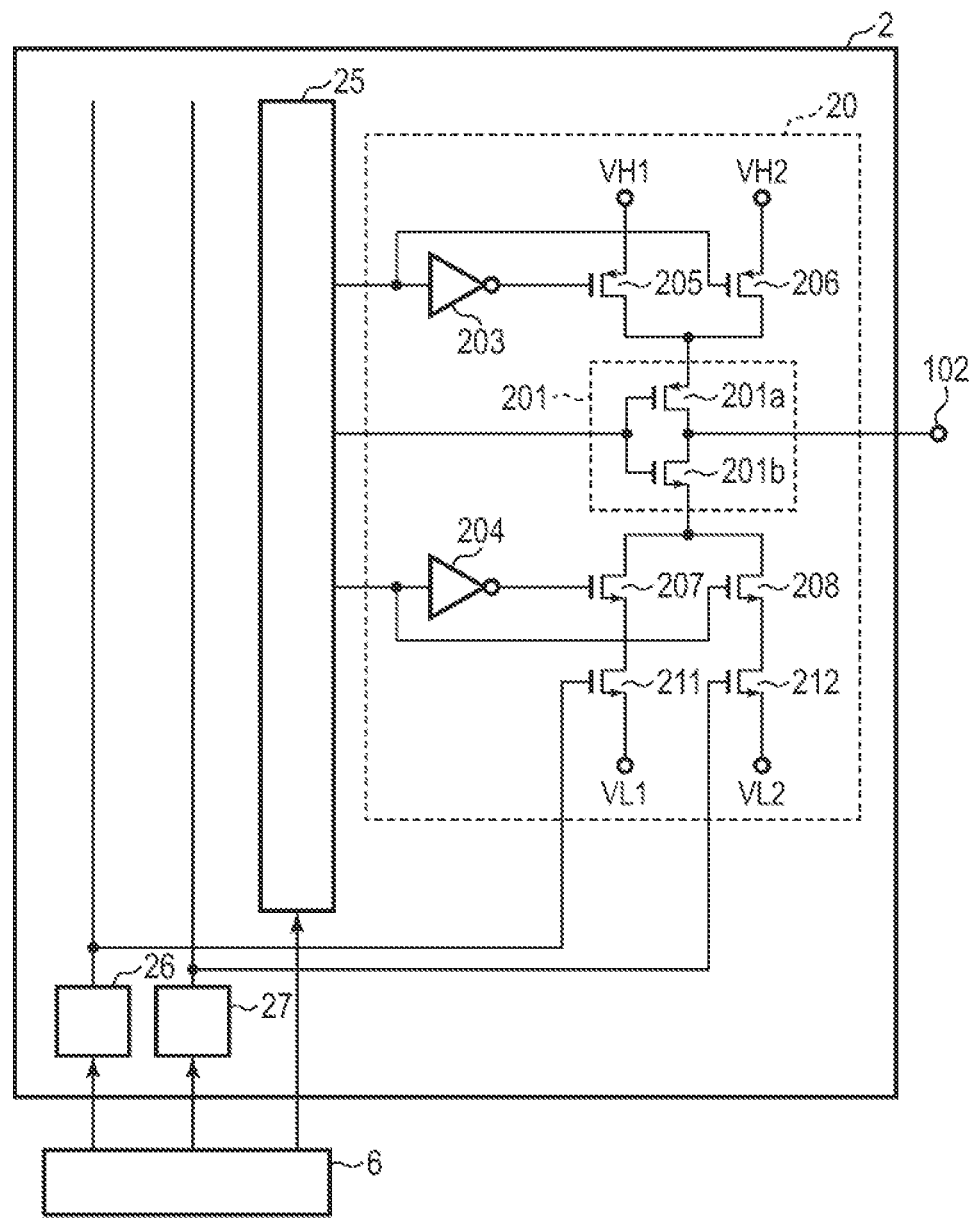
FIG. 14 is a block diagram of a vertical scanning circuit according to a sixth embodiment.

FIG. 14 is a block diagram of the vertical scanning circuit according to the present embodiment. The vertical scanning circuit in the present embodiment may itch voltages of the high level and the low level of the control signal, respectively.

The vertical scanning circuit 2 includes a buffer circuit 20, a scanning circuit 25, and bias circuits 26, 27. The buffer circuit 20 includes inverters 201, 203, 204, a p-channel transistors 205, 206, and an n-channel transistors 207, 208, 211, 212. In the present embodiment, one of the first voltage VH1 and the third voltage VH2 may be selected by the first switch circuit comprised of the transistors 205, 206. Further, one of the second voltage VL1 and the fourth voltage VL2 may be selected by the second switch circuit comprised of the transistors 207, 208.

The inverter 201 includes p-channel transistors 201a, 201b as in the fifth embodiment, receives a signal from the scanning circuit 25, and outputs the control signal. The source of the transistor 201a is connected to the drains of the p-channel transistors 205, 206. A voltage VH1 is applied to the source of the transistor 205, and a voltage VH2 is applied to the source of the transistor 206. The gate of the transistor 206 receives a first signal from the scanning circuit 25, and the gate of the transistor 205 receives a signal obtained by inverting the first signal by the inverter 203. That is, the transistor 205, 206 operates complementarily in response to the first signal, and any one of the voltages VH1 and VH2 is supplied to the inverter 201. The source of the transistor 201b of the inverter 201 is connected to the drains of the two n-channel transistors 207, 208. The gate of the transistor 208 receives a second signal from the scanning circuit 25, and the gate of the 207 receives a signal obtained by inverting the second signal by the inverter 204. The source of the transistor 207 is supplied with the voltage VL1 via the transistor 211, and the source of the transistor 208 is supplied with the voltage VL2 via the transistor 212. The transistor 207, 208 operates complementarily in response to the second signal, and any one of the voltages VL1 and VL2 is supplied to the inverter 201. A bias voltage from the bias circuit 26 is applied to the gate of the transistor 211, and a bias voltage from the bias circuit 27 is applied to the gate of the transistor 212.

Also in the present embodiment, when the signal input to the inverter 201 transitions from the low level to the high level, the current flowing through the transistor 201b is restricted to the constant current of one of the transistors 211, 212. Therefore, the output voltage of the inverter 201 changes from the voltage VH to the voltage VL at a constant rate of change, and the falling signal waveform of the control signal φINC on the signal line 16 may be blunted. On the other hand, when the signal input to the inverter 201 changes from high level to low level, the current flowing through the transistor 201a is not restricted by the transistor 202, and the output voltage of the inverter 201 changes from the voltage VL to any of the voltages VH1 and VH2 in a short time. Therefore, even in the present embodiment, it is possible to generate the control signal φINC having a falling time shorter than the rising time. Thereby, charge injection from the capacitance addition transistor 106, 115, 116 to the FD portion 107 may be suppressed, and image quality deterioration may be avoided.

In the bulla circuit 20 described above, the voltages VH1, VH2, VL1, VL2 may be appropriately set. Fear example, one of the voltages VH1 and VH2 may be a power supply voltage, and one of the voltages VL1 and VL2 may be a ground voltage. When voltage VH1 is the power supply voltage and voltage VL1 is the ground voltage, the relationship: VH1>VH2>VL2>VL1 may be established. At least one of the voltages VH2 and VL2 (Hereinafter referred to as "intermediate voltage") intermediate between the voltages VH1 and VL1 may be set to a voltage near the threshold voltage of the capacitance addition transistor 115, 116. In the pixels 10 illustrated in FIG. 5, FIG. 6, and FIG. 12, the capacitance addition transistor 115, 116 also functions as a reset transistor for resetting the FD portion 107. By applying an intermediate voltage to the gate of the capacitance addition transistors 115, 116 while the photoelectric converter 101 is accumulating charge, durability reliability against an electric field around the gate electrode may be improved while suppressing image quality deterioration due to blooming. The reason will be described in detail below.

In general, the drain-source current Ids in the subthreshold region of the MOS transistor is logarithmically proportional to the gate-solace voltage Vgs. The slope of the line in the subthreshold region when the Ids-Vgs characteristic is represented by a semilogarithmic graph is called the S-factor (subthreshold swing), and is sometimes used as an index representing the characteristic of a transistor. The S-factor s generally about 100 [mV/decade], and an approximate value is determined depending on the structure of the transistor. The drain-source current Ids in the subthreshold region decreases according to the S-factor below the threshold voltage. When a current such as a gate leakage current or a blooming current flows into the FD portion 107, a potential drop occurs in the FD portion 107 so that the inflow current is balanced with the drain-source current Ids of the capacitance addition transistors 115, 116, and the FD portion 107 becomes a prescribed voltage. That is, the potential of the FD portion 107 is dipped by the gate of the capacitance addition transistors 115, 116, and the potential of the FD portion 107 does not fall below the voltage corresponding to (gate voltage–threshold voltage Vth).

Thus, by applying the intermediate voltage to the gate of the capacitance addition transistors 115, 116, the potential of the FD portion 107 is set to a potential corresponding to the amount of current flowing into the FD portion 107. Further, since the higher the potential of the FD portion 107 is, the higher the proportion at which the blooming current flowing out of the saturated photoelectric converter 101 flows into the FD portion, it is preferable to keep the potential of the FD portion 107 high except for the pixel 10 having a particularly large amount of current.

For example, during the period of charge accumulation in the photoelectric convener 101, a strong electric field may be applied between the transfer transistor 102 in the off-state and the FD portion 107. In such a case, in the pixel 10 including the transfer transistor 102 having a relatively large gate leakage current due to variations in the manufacture of the gate insulating film or the like, the potential of the FD portion 107 is lowered by the gate leakage current flowing into the FD portion 107. As a result, the electric field between the gate of the transfer transistor 102 and the FD portion 107 is relaxed. That is, the electric field between the gate of the transfer transistor 102 and the FD portion 107 is relaxed in a self-aligned manner according to the magnitude of the gate leakage current, and the durability reliability of the gate insulating film under the electric field may be improved. By keeping the electric potential of the FD portion 107 high, the FD portion 107 also act as an overflow drain against the blooming phenomenon in which the charge overflowed out as a false signal to the other pixel 10 after the photoelectric converter 101 reaches the saturated charge amount, so that image quality deterioration due to blooming may be suppressed. By applying the intermediate voltage to the gate of the capacitance addition transistors 115, 116 during the accumulation period, an effect of suppressing image quality deterioration due to blooming may be obtained.

Seventh Embodiment

Figure 15:
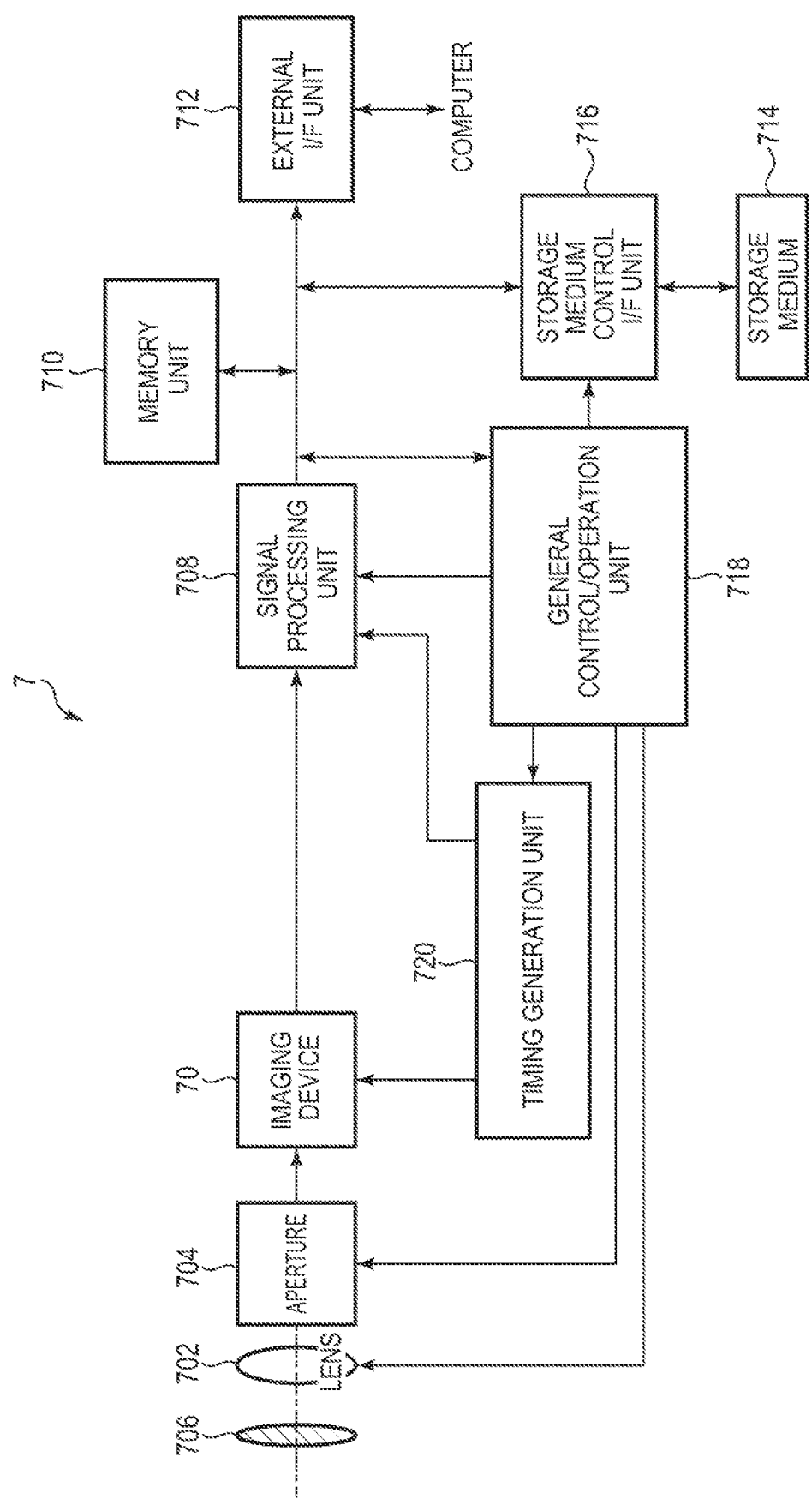
FIG. 15 is a block diagram of an imaging system according to a seventh embodiment.

An imaging system according to a seventh embodiment of the present invention will be described with reference to FIG. 15. FIG. 15 is a block diagram illustrating a configuration example of an imaging system according to the present embodiment.

The imaging device in the above-described embodiments may be applied to various imaging systems. The imaging systems include a digital still camera, a digital camcorder, a camera head, a copying machine, a fax machine, a mobile phone, an in-vehicle camera, an observation satellite, and a surveillance camera. FIG. 15 illustrates a block diagram of a digital still camera as an example of the imaging system.

An imaging system 7 illustrated in FIG. 15 includes a barrier 706, a lens 702, an aperture 704, an imaging device 70, a signal processing unit 708, a timing generation unit 720, a general control/operation unit 718, a memory unit 710, a storage medium control I/F unit 716, a storage medium 714, and an external I/F unit 712. The barrier 706 protects the lens, and the lens 702 forms an optical image of an object on the imaging device 70. The aperture 704 varies the quantity of light passing through the lens 702. The imaging device 70 is configured as in the above embodiments, and converts the optical image formed by the lens 702 into image data (image signal). Assume that a semiconductor substrate of the imaging device 70 is provided with an AD (analog to digital) converter. The signal processing unit 708 performs various processing, such as correction and compression of data to the imaging data output from the imaging device 70.

The timing generation unit 720 outputs various timing signals to the imaging device 70 and the signal processing unit 708. The general control/operation unit 718 controls the entire digital still camera, and the memory unit 710 temporarily stores image data. The storage medium control I/F unit 716 is an interface for recording or reading out image data on or from the storage medium 714, and the storage medium 714 is a removable storage medium such as a semiconductor memory for recording or reading out image data. The external I/F unit 712 is an interface for communicating with an external computer or the like. The timing signal or the like may be input from the outside of the imaging system, and the imaging system may include at least the imaging device 70 and the signal processing unit 708 for processing the imaging signal output from the imaging device 70.

In the present embodiment, the imaging device 70 and the AD conversion unit are provided on different semiconductor substrates, but the imaging device 70 and the AD conversion unit may be formed on the same semiconductor substrate. The imaging device 70 and the signal processing unit may be formed on the same semiconductor substrate.

Each pixel may also include a first photoelectric converter and a second photoelectric converter. The signal processing unit 708 may be configured to process the pixel signal based on charge generated in the first photoelectric converter and the pixel signal based on charge generated in the second photoelectric converter, and acquire distance information from the imaging device 70 to the object.

Eighth Embodiment

Figure 16A:
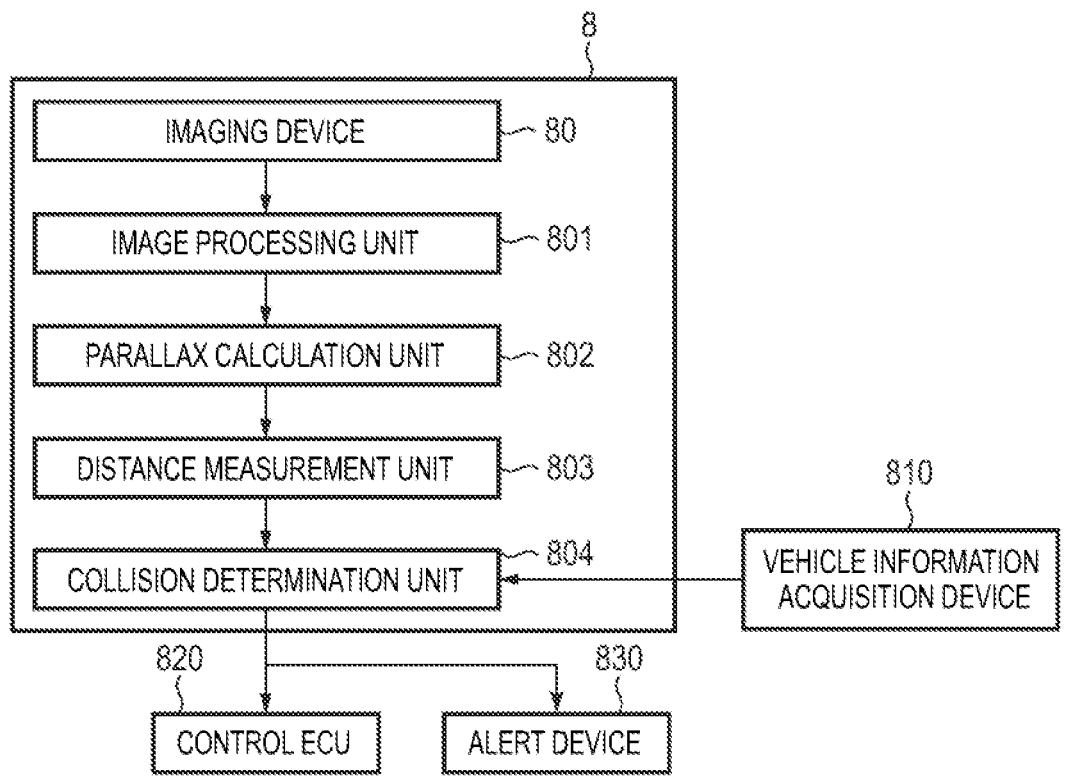
FIG. 16A and FIG. 16B are block diagrams of an imaging system in an on-vehicle camera according to an eighth embodiment.
Figure 16B:
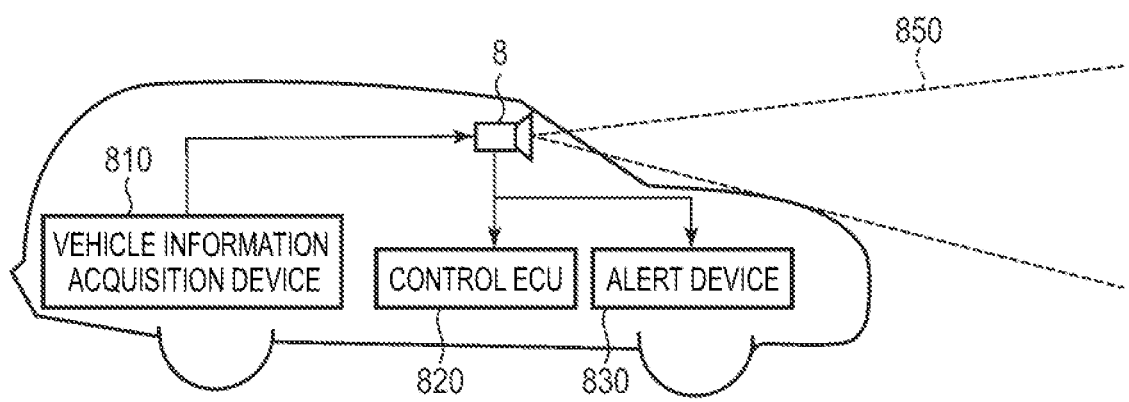

FIG. 16A and FIG. 16B are block diagrams of an imaging system relating to an on-vehicle camera according to the present embodiment. The imaging system 8 includes the imaging device 80 according to the above-described embodiments. The imaging system 8 includes an image processing unit 801 for performing image processing on a plurality of image data acquired by the imaging device 80 and a parallax calculation unit 802 for calculating parallax (phase difference of the parallax image) from the plurality of image data acquired by the imaging system 8. The imaging system 8 includes a distance measurement unit 803 for calculating the distance to the object based on the calculated parallax, and a collision determination unit 804 for determining whether or not there is a possibility of collision based on the calculated distance. The parallax calculation unit 802 and the distance measurement unit 803 are examples of distance information acquiring means for acquiring distance information to the object. That is, the distance information is information on parallax, defocus amount, distance to the object, and the like. The collision determination unit 804 may determine the possibility of collision by using any of the distance information. The distance information acquisition means may be realized by dedicated hardware or by a software module. Further, it may be realized by an FPGA (Field Programmable Gate Array), an ASIC (Application Specific Integrated Circuit), or a combination thereof.

The imaging system 8 is connected to a vehicle information acquisition device 810, and can acquire vehicle information such as vehicle speed, yaw rate, and steering angle. Further, the imaging system 8 is connected to a control ECU 820, which is a control device for outputting a control signal for generating a braking force to the vehicle based on the determination result by the collision determination unit 804. The imaging system 8 is also connected to an alert device 830 for issuing an alarm to the driver based on the result of the determination by the collision determination unit 804. For example, when the collision determination unit 804 determines that there is a high possibility of a collision, the control ECU 820 performs vehicle control to avoid a collision and reduce damage by applying a brake, returning an accelerator, or suppressing engine output. The alert device 830 alerts the user by sounding an alarm such as a sound, displaying alert information on a screen of a car navigation system or the like, vibrating a seat belt or a steering wheel the like. The imaging system 8 functions as a control means for controlling the operation of controlling the vehicle as described above.

In the present embodiment, a periphery of the vehicle, for example, front or rear, is imaged by the imaging system 8. FIG. 16B illustrates an imaging system for imaging the front of a vehicle (imaging range 850). The vehicle information acquisition device 810 as the imaging control means sends an instruction to the imaging system 8 or the imaging device 80 so as to perform the operations described in the above-described first to seventh embodiments. With this configuration, the accuracy of distance measurement may be further improved.

Although the example of controlling the vehicle so as not to collide with another vehicle has been described above, the present invention may also be applied to a control for automatically driving following another vehicle, a control for automatically driving so as not to protrude from a lane, and the like. Further, the imaging system is not limited to a vehicle such as an automobile, and may be applied to a mobile body (mobile device) such as a ship, an aircraft, an artificial satellite, an industrial robot, and a consumer robot. In addition, the present invention may be applied not only to a mobile body but also to equipment using object recognition or biological recognition, such as an intelligent transport system (ITS), a monitoring system, and the like.

Modified Embodiments

The present invention is not limited to the above-described embodiments, and various modifications are possible. For example, an example in which a part of the configuration of any of the embodiments is added to another embodiment or an example in which a part of the configuration of any of the embodiments is replaced with a part of the configuration of another embodiment is also one of the embodiments of the present invention.

For the control signals φSEL, φRES, φINC, φTX, and φcir other than the control signal φINC, the voltage change amount per unit time may be reduced. For example, by blunting the falling signal waveform of the control signal φTX, it is possible to suppress the residual charge due to the potential barrier under the gate of the transfer transistor 102 from returning to the photoelectric convener 101. The voltage change amount per unit time from the high level to the low level of the control signal φTX may be set small. That is, by increasing the fall time of the control signal φTX, electrons may be drained from the potential barrier. Further, the time may be appropriately set according to the type of the control signal.

Further, the waveform change of the falling edge of the control signal φINC may not necessarily be continuous, or may be a stepwise change. For example, in FIG. 14, the voltages VH1, VH2, VL1, VL2 may be sequentially supplied to the gates of the capacitance addition transistors 106, 115, 116 to change the gate voltage stepwise.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is tot limited to the disclosed exemplary embodiments. The scope of the following claims is to be accorded the broadest interpretation so as to encompass all such modifications and equivalent structures and functions.

This application claims the benefit of Japanese Patent Application No. 2020-033001, Filed Feb. 28, 2020 which is hereby incorporated by reference herein in its entirety.

What is claimed is:

1. An imaging device comprising:
a pixel including a photoelectric converter; an amplifier transistor having an input node that holds charge from the photoelectric converter and configured to output a signal based on the charge of the input node; a select transistor configured to output the signal output from the amplifier transistor to a readout circuit fifer ding out the signal; a reset transistor configured to set a potential of the input node to a prescribed reset potential; and a capacitance addition transistor connected to the input node and configured to switch the capacitance value of the input node; and
a drive circuit configured to turn on the capacitance addition transistor by setting a gate voltage of the capacitance addition transistor to a fast voltage, and turn off the capacitance addition transistor by setting the gate voltage of the capacitance addition transistor to a second voltage,
wherein the gate voltage is changed from the first voltage to the second voltage during a period when the signal from the amplifier transistor is output from the pixel via the select transistor, and
wherein a voltage change amount per unit time when the gate voltage changes from the first voltage to the second voltage is smaller than a voltage change amount per unit time when the gate voltage changes from the second voltage to the first voltage.

2. The imaging device according to claim 1, wherein the gate voltage changes from the first voltage to the second voltage during a period in which the reset transistor is in an on-state.

3. The imaging device according to claim 1, wherein a first main node of the capacitance addition transistor is connected to the input node, and a second main node of the capacitance addition transistor is connected to a capacitor unit.

4. The imaging device according to claim 1, wherein the capacitance addition transistor is provided in an electrical path between the input node and the reset transistor.

5. The imaging device according claim 4, wherein a first main node of the capacitance addition transistor is connected to the input node, and a second main node of the capacitance addition transistor is connected to one main node of the reset transistor.

6. The imaging device according to claim 5, wherein the readout circuit reads out the signal when the capacitance addition transistor is in an off-state and the reset transistor is in an on-state.

7. The imaging device according to claim 5, wherein the readout circuit reads out the signal when the capacitance addition transistor is in aft on-state and the reset transistor is in an off-state.

8. The imaging device according to claim 4,
wherein the capacitance addition transistor includes a first capacitance addition transistor and a second capacitance addition transistor,
wherein a first main node of the first capacitance addition transistor is connected to the input node, and
wherein a first main node of the second capacitance addition transistor is connected to a second main node of the first capacitance addition transistor, and a second main node of the second capacitance addition transistor is connected to one main node of the reset transistor.

9. The imaging device according to claim 8, wherein the readout circuit is configured to selectively perform one of
- a first operation mode in which the readout circuit reads out the signal when the first capacitance addition transistor and the second capacitance addition transistor are in an on-state,
- a second operation mode in which the readout circuit reads out the signal when the first capacitance addition transistor is in an on-state and the second capacitance addition transistor is in an off-state, and
- a third operation mode in which the readout circuit reads out the signal when the first capacitance addition transistor is in an off-state and the second capacitance addition transistor is in an on-state.

10. The imaging device according to claim 9, wherein the reset transistor is in an off-state in the first operation mode.

11. The imaging device according to claim 9, wherein the reset transistor is in an on-state in the second operation mode and the third operation mode.

12. The imaging device according to claim 8, wherein a gate of the second capacitance addition transistor is connected to a first voltage line supplying the first voltage.

13. The imaging device according to claim 1,
wherein the drive circuit drives the gate voltage with a prescribed drive current, and
wherein the drive current for changing the gate voltage from the first voltage to the second voltage is smaller than the drive current for changing the into voltage from the second voltage to the first voltage.

14. The imaging device according to claim 13, wherein the drive circuit includes
- a first transistor which is in an on-state when the gate voltage is changed from the first voltage to the second voltage; and
- a current source which is provided in an electrical path between a first main node of the first transistor and a second voltage line supplying the second voltage and configured to define the drive current.

15. The imaging device according to claim 14, further comprising a second transistor which is in an on-state when the gate voltage is changed from the second voltage to the first voltage,
wherein the first voltage is supplied to a second main node of the second transistor.

16. The imaging device according to claim 15, wherein driving circuit is configured to set the gate voltage to a voltage intermediate between the first voltage and the second voltage during a period in which the photoelectric converter accumulates charge.

17. The imaging device according to claim 16, herein the drive circuit further includes a second switch circuit configured to selectively supply to the second main node of the second transistor one of the first voltage and a third voltage intermediate between the first voltage and the second voltage.

18. The imaging device according to claim 17, herein the drive circuit further includes a first switch circuit configured to selectively supply to the first main node of the first transistor one of the second voltage and a fourth age intermediate between the first voltage and the second voltage.

19. An imaging system comprising:
imaging device according to claim 1; and
a signal processing unit configured to process an image signal output from the imaging device.

20. The imaging system according to claim 19,
wherein the pixel includes a plurality of photoelectric converters, and
wherein the signal processing unit is configured to process the image signals generated by the plurality of photoelectric converters, respectively, and acquire a distance information from the imaging device to an object.

* * * * *